United States Patent
Hassanein et al.

(10) Patent No.: US 11,856,944 B2
(45) Date of Patent: Jan. 2, 2024

(54) ORGAN CARE SOLUTION FOR EX-VIVO MACHINE PERFUSION OF DONOR LUNGS

(71) Applicant: TransMedics, Inc., Andover, MA (US)

(72) Inventors: Waleed H. Hassanein, North Andover, MA (US); Ihab Abdel Fattah, Andover, MA (US); Paul Lezberg, Westford, MA (US); Tamer I. Khayal, North Andover, MA (US); Robert Havener, Lynnfield, MA (US); Anas Abdelazim, North Andover, MA (US)

(73) Assignee: TRANSMEDICS, INC., Andover, MA (US)

( * ) Notice: Subject to any disclaimer, the term of this patent is extended or adjusted under 35 U.S.C. 154(b) by 0 days.

(21) Appl. No.: 17/869,701

(22) Filed: Jul. 20, 2022

(65) Prior Publication Data

US 2022/0361482 A1    Nov. 17, 2022

Related U.S. Application Data

(62) Division of application No. 13/446,706, filed on Apr. 13, 2012, now abandoned.

(60) Provisional application No. 61/475,524, filed on Apr. 14, 2011.

(51) Int. Cl.
*A01N 1/02* (2006.01)

(52) U.S. Cl.
CPC ......... *A01N 1/0226* (2013.01); *A01N 1/0247* (2013.01)

(58) Field of Classification Search
CPC .............................. A01N 1/0226; A01N 1/0247
See application file for complete search history.

(56) References Cited

U.S. PATENT DOCUMENTS

| | | | |
|---|---|---|---|
| 3,253,595 A | 5/1966 | Keller, Jr. et al. |
| 3,388,803 A | 6/1968 | Scott |
| 3,406,531 A | 10/1968 | Koski et al. |
| 3,468,136 A | 9/1969 | Koski et al. |
| 3,537,956 A | 11/1970 | Falcone |
| 3,545,221 A | 12/1970 | Koski et al. |
| 3,545,605 A | 12/1970 | Robins |
| 3,587,567 A | 6/1971 | Schiff |
| 3,607,646 A | 9/1971 | de Roissart |
| 3,632,473 A | 1/1972 | Belzer et al. |
| 3,639,084 A | 2/1972 | Goldhaber |
| 3,654,085 A | 4/1972 | Fritz et al. |
| 3,660,241 A | 5/1972 | Michielsen |
| 3,738,914 A | 6/1973 | Thorne et al. |

(Continued)

FOREIGN PATENT DOCUMENTS

| | | |
|---|---|---|
| CA | 2144952 A1 | 3/1994 |
| CA | 2881613 A1 | 11/2007 |

(Continued)

OTHER PUBLICATIONS

US 11,758,904 B2, 09/2023, Freed (withdrawn)

(Continued)

*Primary Examiner* — Blaine Lankford
*Assistant Examiner* — Lauren K Van Buren
(74) *Attorney, Agent, or Firm* — Wilmer Cutler Pickering Hale and Dorr LLP

(57) ABSTRACT

An ex-vivo lung solution for machine perfusion of donor lungs on OCS. The solution may be mixed with whole blood or packed red blood cells to form the OCS lung perfusion solution.

18 Claims, 7 Drawing Sheets

(56) References Cited

U.S. PATENT DOCUMENTS

| | | |
|---|---|---|
| 3,772,153 A | 11/1973 | De Roissart |
| 3,777,507 A | 12/1973 | Burton et al. |
| 3,843,455 A | 10/1974 | Bier et al. |
| 3,851,646 A | 12/1974 | Sarns |
| 3,881,990 A | 5/1975 | Burton et al. |
| 3,995,444 A | 12/1976 | Clark et al. |
| 4,004,298 A | 1/1977 | Freed |
| 4,069,826 A | 1/1978 | Sessions |
| 4,186,253 A | 1/1980 | Yokoyama et al. |
| 4,186,565 A | 2/1980 | Toledo-Pereyra |
| 4,231,354 A | 11/1980 | Kurtz et al. |
| 4,415,556 A | 11/1983 | Bretschneider |
| 4,598,697 A | 7/1986 | Numazawa et al. |
| 4,605,644 A | 8/1986 | Foker |
| 4,666,425 A | 5/1987 | Fleming |
| 4,719,201 A | 1/1988 | Foker |
| 4,723,939 A | 2/1988 | Anaise |
| 4,745,759 A | 5/1988 | Bauer et al. |
| 4,759,371 A | 7/1988 | Franetzki |
| 4,801,299 A | 1/1989 | Brendel et al. |
| 4,847,470 A | 7/1989 | Bakke |
| 4,920,044 A | 4/1990 | Bretan, Jr. |
| 5,051,352 A | 9/1991 | Martindale et al. |
| 5,066,578 A | 11/1991 | Wikman-Coffelt |
| 5,141,847 A | 8/1992 | Sugimachi et al. |
| 5,145,771 A | 9/1992 | Lemasters et al. |
| 5,157,930 A | 10/1992 | McGhee et al. |
| 5,200,398 A | 4/1993 | Strasberg et al. |
| 5,217,860 A | 6/1993 | Fahy et al. |
| 5,285,657 A | 2/1994 | Bacchi et al. |
| 5,306,711 A | 4/1994 | Andrews |
| 5,326,706 A | 7/1994 | Yland et al. |
| 5,338,662 A | 8/1994 | Sadri |
| 5,354,268 A | 10/1994 | Peterson et al. |
| 5,356,593 A | 10/1994 | Heiberger et al. |
| 5,356,771 A | 10/1994 | O'Dell |
| 5,358,931 A | 10/1994 | Rubinsky et al. |
| 5,362,622 A | 11/1994 | O'Dell et al. |
| 5,370,989 A | 12/1994 | Stern et al. |
| 5,381,510 A | 1/1995 | Ford et al. |
| 5,385,821 A | 1/1995 | O'Dell et al. |
| 5,395,314 A | 3/1995 | Klatz et al. |
| 5,405,742 A | 4/1995 | Taylor |
| 5,407,669 A | 4/1995 | Lindstrom et al. |
| 5,407,793 A | 4/1995 | Del Nido et al. |
| 5,472,876 A | 12/1995 | Fahy |
| 5,473,791 A | 12/1995 | Holcomb et al. |
| 5,494,822 A | 2/1996 | Sadri |
| 5,498,427 A | 3/1996 | Menasche |
| 5,505,709 A | 4/1996 | Funderburk et al. |
| 5,514,536 A | 5/1996 | Taylor |
| 5,552,267 A | 9/1996 | Stern et al. |
| 5,554,123 A | 9/1996 | Herskowitz |
| 5,554,497 A | 9/1996 | Raymond |
| 5,571,801 A | 11/1996 | Segall et al. |
| 5,584,804 A | 12/1996 | Klatz et al. |
| 5,586,438 A | 12/1996 | Fahy |
| 5,588,816 A | 12/1996 | Abbott et al. |
| 5,599,173 A | 2/1997 | Chen et al. |
| 5,599,659 A | 2/1997 | Brasile et al. |
| 5,613,944 A | 3/1997 | Segall et al. |
| 5,643,712 A | 7/1997 | Brasile |
| 5,654,266 A | 8/1997 | Chen et al. |
| 5,656,420 A | 8/1997 | Chien |
| 5,679,565 A | 10/1997 | Mullen et al. |
| 5,693,462 A | 12/1997 | Raymond |
| 5,698,536 A | 12/1997 | Segall et al. |
| 5,699,793 A | 12/1997 | Brasile |
| 5,702,881 A | 12/1997 | Brasile et al. |
| 5,716,378 A | 2/1998 | Minten |
| 5,723,281 A | 3/1998 | Segall et al. |
| 5,733,894 A | 3/1998 | Segall et al. |
| 5,747,071 A | 5/1998 | Segall et al. |
| 5,752,929 A | 5/1998 | Klatz et al. |
| 5,759,148 A | 6/1998 | Sipin |
| 5,770,149 A | 6/1998 | Raible |
| 5,776,063 A | 7/1998 | Dittrich et al. |
| 5,786,136 A | 7/1998 | Mayer |
| 5,787,544 A | 8/1998 | Meade |
| 5,807,737 A | 9/1998 | Schill et al. |
| 5,823,799 A | 10/1998 | Tor et al. |
| 5,843,024 A | 12/1998 | Brasile |
| 5,856,081 A | 1/1999 | Fahy |
| 5,882,328 A | 3/1999 | Levy et al. |
| 5,965,433 A | 10/1999 | Gardetto et al. |
| 5,998,240 A | 12/1999 | Hamilton et al. |
| 6,024,698 A | 2/2000 | Brasile |
| 6,034,109 A | 3/2000 | Ramasamy et al. |
| 6,042,550 A | 3/2000 | Haryadi et al. |
| 6,046,046 A | 4/2000 | Hassanein |
| 6,050,987 A | 4/2000 | Rosenbaum |
| 6,090,776 A | 7/2000 | Kuberasampath et al. |
| 6,100,082 A | 8/2000 | Hassanein |
| 6,110,139 A | 8/2000 | Loubser |
| 6,110,504 A | 8/2000 | Segall et al. |
| 6,144,444 A | 11/2000 | Haworth et al. |
| 6,168,877 B1 | 1/2001 | Pedicini et al. |
| 6,217,546 B1 | 4/2001 | Hinchliffe et al. |
| 6,365,338 B1 | 4/2002 | Bull et al. |
| 6,375,611 B1 | 4/2002 | Voss et al. |
| 6,375,613 B1 | 4/2002 | Brasile |
| 6,389,308 B1 | 5/2002 | Shusterman |
| 6,402,461 B1 | 6/2002 | Tebby |
| 6,475,716 B1 | 11/2002 | Seki |
| 6,490,880 B1 | 12/2002 | Walsh |
| 6,492,103 B1 | 12/2002 | Taylor |
| 6,492,745 B1 | 12/2002 | Colley, III et al. |
| 6,524,785 B1 | 2/2003 | Cozzone et al. |
| 6,526,974 B1 | 3/2003 | Brydon et al. |
| 6,569,615 B1 | 5/2003 | Thatte et al. |
| 6,582,375 B2 | 6/2003 | Melvin et al. |
| 6,582,953 B2 | 6/2003 | Brasile |
| 6,600,941 B1 | 7/2003 | Khuri |
| 6,609,987 B1 | 8/2003 | Beardmore |
| 6,631,830 B2 | 10/2003 | Ma et al. |
| 6,642,045 B1 | 11/2003 | Brasile |
| 6,673,594 B1 | 1/2004 | Owen et al. |
| 6,696,238 B2 | 2/2004 | Murphy et al. |
| 6,740,484 B1 | 5/2004 | Khirabadi et al. |
| 6,764,462 B2 | 7/2004 | Risk, Jr. et al. |
| 6,783,328 B2 | 8/2004 | Lucke et al. |
| 6,792,309 B1 | 9/2004 | Noren |
| 6,794,124 B2 | 9/2004 | Steen |
| 6,811,965 B2 | 11/2004 | Vodovotz et al. |
| 6,837,851 B1 | 1/2005 | Coroneo |
| 6,878,339 B2 | 4/2005 | Akiyama et al. |
| 6,894,690 B2 | 5/2005 | Capers |
| 6,906,325 B2 | 6/2005 | Quek |
| 6,925,324 B2 | 8/2005 | Shusterman |
| 6,953,655 B1 | 10/2005 | Hassanein et al. |
| 6,974,436 B1 | 12/2005 | Aboul-Hosn et al. |
| 7,001,354 B2 | 2/2006 | Suzuki et al. |
| 7,008,380 B1 | 3/2006 | Rees et al. |
| 7,045,279 B1 | 5/2006 | Laske et al. |
| 7,122,371 B1 | 10/2006 | Ma |
| 7,238,165 B2 | 7/2007 | Vincent et al. |
| 7,316,666 B1 | 1/2008 | Entenman et al. |
| 7,410,474 B1 | 8/2008 | Friend et al. |
| 7,431,727 B2 | 10/2008 | Cole et al. |
| 7,452,711 B2 | 11/2008 | Daykin |
| 7,572,622 B2 | 8/2009 | Hassanein et al. |
| 7,651,835 B2 | 1/2010 | Hassanein et al. |
| 7,811,808 B2 | 10/2010 | Van Der Plaats et al. |
| 8,167,869 B2 | 5/2012 | Wudyka |
| 8,304,181 B2 | 11/2012 | Hassanein et al. |
| 8,323,954 B2 | 12/2012 | Kravitz et al. |
| 8,409,846 B2 | 4/2013 | Hassanein et al. |
| 8,420,380 B2 | 4/2013 | Fishman et al. |
| 8,465,970 B2 | 6/2013 | Hassanein et al. |
| 8,535,934 B2 | 9/2013 | Hassanein et al. |
| 8,585,380 B2 | 11/2013 | Hassanein et al. |
| 8,715,305 B2 | 5/2014 | Pate et al. |
| 8,822,203 B2 | 9/2014 | Hassanein et al. |
| 9,055,740 B2 | 6/2015 | Hassanein et al. |

(56) References Cited

U.S. PATENT DOCUMENTS

| | | |
|---|---|---|
| 9,215,867 B2 | 12/2015 | Hassanein et al. |
| 9,457,179 B2 | 10/2016 | Hassanein et al. |
| 9,462,802 B2 | 10/2016 | Fishman et al. |
| 9,706,768 B2 | 7/2017 | Freed et al. |
| 9,894,894 B2 | 2/2018 | Hassanein et al. |
| 10,076,112 B2 | 9/2018 | Hassanein et al. |
| 10,124,093 B1 | 11/2018 | Francis et al. |
| 10,321,676 B2 | 6/2019 | Hassanein et al. |
| 10,327,441 B2 | 6/2019 | Freed et al. |
| 10,362,780 B2 | 7/2019 | Kay et al. |
| 10,433,539 B2 | 10/2019 | White et al. |
| 10,736,314 B2 | 8/2020 | Hassanian et al. |
| 10,750,738 B2 | 8/2020 | Hassanian et al. |
| 11,122,795 B2 | 9/2021 | Hassanian et al. |
| 11,154,050 B2 | 10/2021 | Hassanein et al. |
| 11,191,263 B2 | 12/2021 | Hassanein et al. |
| 11,570,985 B2 | 2/2023 | Hassanein et al. |
| 11,723,357 B2 | 8/2023 | Hassanein et al. |
| 11,785,939 B2 | 10/2023 | Freed |
| 2001/0003652 A1 | 6/2001 | Freeman |
| 2001/0018569 A1 | 8/2001 | Erbel et al. |
| 2001/0025191 A1 | 9/2001 | Montgomery |
| 2002/0012988 A1 | 1/2002 | Brasile |
| 2002/0102720 A1 | 8/2002 | Steen |
| 2002/0132220 A1 | 9/2002 | Berens et al. |
| 2002/0151950 A1 | 10/2002 | Okuzumi |
| 2002/0164795 A1 | 11/2002 | Gen |
| 2002/0177117 A1 | 11/2002 | Wolf |
| 2002/0187132 A1 | 12/2002 | Mcgregor et al. |
| 2002/0198504 A1 | 12/2002 | Risk et al. |
| 2003/0040665 A1 | 2/2003 | Khuri et al. |
| 2003/0050689 A1 | 3/2003 | Matson |
| 2003/0053998 A1 | 3/2003 | Daemen et al. |
| 2003/0073227 A1 | 4/2003 | Hull et al. |
| 2003/0073912 A1 | 4/2003 | Melvin et al. |
| 2003/0074760 A1 | 4/2003 | Keller |
| 2003/0086830 A1 | 5/2003 | Haywood et al. |
| 2003/0111604 A1 | 6/2003 | Quek |
| 2003/0124503 A1 | 7/2003 | Olivencia-Yurvati et al. |
| 2003/0135152 A1 | 7/2003 | Kollar et al. |
| 2003/0147466 A1 | 8/2003 | Liang |
| 2003/0168064 A1 | 9/2003 | Daly et al. |
| 2004/0015042 A1 | 1/2004 | Vincent et al. |
| 2004/0017658 A1 | 1/2004 | Lo et al. |
| 2004/0018966 A1 | 1/2004 | Segall et al. |
| 2004/0029096 A1 | 2/2004 | Steen |
| 2004/0038192 A1 | 2/2004 | Brasile |
| 2004/0058432 A1 | 3/2004 | Owen et al. |
| 2004/0082057 A1 | 4/2004 | Alford et al. |
| 2004/0086578 A1 | 5/2004 | Segall et al. |
| 2004/0102415 A1 | 5/2004 | Thatte et al. |
| 2004/0102678 A1 | 5/2004 | Haindl |
| 2004/0106958 A1 | 6/2004 | Mathis et al. |
| 2004/0110800 A1 | 6/2004 | Bril et al. |
| 2004/0115689 A1 | 6/2004 | Augello et al. |
| 2004/0138542 A1 | 7/2004 | Khuri et al. |
| 2004/0168341 A1 | 9/2004 | Petersen et al. |
| 2004/0170950 A1 | 9/2004 | Prien |
| 2004/0171138 A1 | 9/2004 | Hassanein et al. |
| 2004/0193096 A1 | 9/2004 | Cooper |
| 2004/0202993 A1 | 10/2004 | Poo et al. |
| 2004/0221719 A1 | 11/2004 | Wright et al. |
| 2004/0224298 A1 | 11/2004 | Brassil et al. |
| 2004/0235142 A1 | 11/2004 | Schein et al. |
| 2004/0236170 A1 | 11/2004 | Kim |
| 2004/0248281 A1 | 12/2004 | Wright et al. |
| 2004/0258745 A1 | 12/2004 | Kai et al. |
| 2005/0010118 A1 | 1/2005 | Toyoda et al. |
| 2005/0019917 A1 | 1/2005 | Toledo-Pereyra et al. |
| 2005/0027237 A1 | 2/2005 | Weiner |
| 2005/0037330 A1 | 2/2005 | Fischer et al. |
| 2005/0063860 A1 | 3/2005 | Carpenter et al. |
| 2005/0085762 A1 | 4/2005 | Vijay et al. |
| 2005/0142532 A1 | 6/2005 | Poo et al. |
| 2005/0147958 A1 | 7/2005 | Hassanein et al. |
| 2005/0153271 A1 | 7/2005 | Wenrich |
| 2005/0170019 A1 | 8/2005 | Roth |
| 2005/0182349 A1 | 8/2005 | Linde et al. |
| 2005/0187469 A1 | 8/2005 | Phillips |
| 2005/0202394 A1 | 9/2005 | Dobson |
| 2005/0253390 A1 | 11/2005 | Blazek |
| 2005/0255442 A1 | 11/2005 | Brassil et al. |
| 2006/0034941 A1 | 2/2006 | Dobson |
| 2006/0039870 A1 | 2/2006 | Turner |
| 2006/0074470 A1 | 4/2006 | Bartels et al. |
| 2006/0121438 A1 | 6/2006 | Toledo-Pereyra et al. |
| 2006/0124130 A1 | 6/2006 | Bonassa |
| 2006/0134073 A1 | 6/2006 | Naka et al. |
| 2006/0148062 A1 | 7/2006 | Hassanein et al. |
| 2006/0154357 A1 | 7/2006 | Hassanein et al. |
| 2006/0154358 A1 | 7/2006 | Hassanein et al. |
| 2006/0154359 A1 | 7/2006 | Hassanein et al. |
| 2006/0160204 A1 | 7/2006 | Hassanein et al. |
| 2006/0166360 A1 | 7/2006 | Berthiaume et al. |
| 2006/0182722 A1 | 8/2006 | Hering et al. |
| 2006/0292544 A1 | 12/2006 | Hassanein et al. |
| 2007/0009881 A1 | 1/2007 | Arzt et al. |
| 2007/0098694 A1 | 5/2007 | Khuri et al. |
| 2007/0135752 A1 | 6/2007 | Domash et al. |
| 2007/0135760 A1 | 6/2007 | Williams |
| 2007/0196461 A1* | 8/2007 | Weers .................. A61K 31/496 424/450 |
| 2007/0275364 A1 | 11/2007 | Hassanein et al. |
| 2008/0009815 A1 | 1/2008 | Grabenkort et al. |
| 2008/0017191 A1 | 1/2008 | Davies et al. |
| 2008/0017194 A1* | 1/2008 | Hassanein ................ A01N 1/02 128/200.24 |
| 2008/0057488 A1 | 3/2008 | Steen |
| 2008/0234768 A1 | 9/2008 | Hassanein et al. |
| 2008/0286746 A1 | 11/2008 | Poo et al. |
| 2008/0295839 A1 | 12/2008 | Habashi |
| 2009/0142830 A1* | 6/2009 | Yamashiro ............... A01N 1/02 435/366 |
| 2009/0143417 A1 | 6/2009 | Smith et al. |
| 2009/0182302 A1 | 7/2009 | Garabet |
| 2009/0191614 A1 | 7/2009 | Miyahara |
| 2009/0197240 A1 | 8/2009 | Fishman et al. |
| 2009/0197241 A1 | 8/2009 | Fishman et al. |
| 2009/0197292 A1 | 8/2009 | Fishman et al. |
| 2009/0197324 A1 | 8/2009 | Fishman et al. |
| 2009/0197325 A1 | 8/2009 | Fishman et al. |
| 2009/0215022 A1 | 8/2009 | Page et al. |
| 2009/0312724 A1 | 12/2009 | Pipkin et al. |
| 2010/0028850 A1 | 2/2010 | Brassil |
| 2010/0056966 A1 | 3/2010 | Toth |
| 2010/0092939 A1 | 4/2010 | Belous et al. |
| 2010/0119554 A1 | 5/2010 | Dobson |
| 2010/0204663 A1 | 8/2010 | Wudyka |
| 2010/0322826 A1 | 12/2010 | Locascio et al. |
| 2010/0322862 A1 | 12/2010 | Ruoslahti et al. |
| 2011/0002926 A1 | 1/2011 | Matthews et al. |
| 2011/0076666 A1 | 3/2011 | Brassil |
| 2011/0129810 A1 | 6/2011 | Owen et al. |
| 2011/0136096 A1 | 6/2011 | Hassanein et al. |
| 2011/0177487 A1 | 7/2011 | Simsir et al. |
| 2011/0190572 A1 | 8/2011 | Brophy et al. |
| 2011/0212431 A1 | 9/2011 | Bunegin et al. |
| 2011/0294108 A1 | 12/2011 | Argoudelis et al. |
| 2012/0064050 A1 | 3/2012 | Calle et al. |
| 2012/0077771 A1 | 3/2012 | Fallouh et al. |
| 2012/0183945 A1 | 7/2012 | Steen et al. |
| 2012/0277681 A1 | 11/2012 | Kravitz et al. |
| 2012/0282591 A1 | 11/2012 | Thatte et al. |
| 2012/0330438 A1 | 12/2012 | Keshavjee et al. |
| 2013/0011823 A1 | 1/2013 | Hassanein et al. |
| 2013/0078710 A1 | 3/2013 | Hassanein et al. |
| 2013/0102917 A1 | 4/2013 | Colbaugh et al. |
| 2013/0144227 A1 | 6/2013 | Locke et al. |
| 2013/0157248 A1 | 6/2013 | Fishman et al. |
| 2013/0220325 A1 | 8/2013 | Davis et al. |
| 2013/0295552 A1 | 11/2013 | Hassanein et al. |
| 2014/0001745 A1 | 1/2014 | Lehmann et al. |
| 2014/0007961 A1 | 1/2014 | Steen et al. |
| 2014/0017658 A1 | 1/2014 | Steinman et al. |

(56) References Cited

U.S. PATENT DOCUMENTS

| | | |
|---|---|---|
| 2014/0017660 A1 | 1/2014 | Steinman et al. |
| 2014/0135738 A1 | 5/2014 | Panian |
| 2014/0220550 A1 | 8/2014 | Van Der Plaats et al. |
| 2014/0283828 A1 | 9/2014 | Acker et al. |
| 2014/0308654 A1 | 10/2014 | Kay et al. |
| 2014/0315175 A1 | 10/2014 | Nguyen et al. |
| 2014/0377849 A1 | 12/2014 | Kay et al. |
| 2015/0017710 A1 | 1/2015 | Freed et al. |
| 2015/0079580 A1 | 3/2015 | Hassanein et al. |
| 2015/0093738 A1 | 4/2015 | Potenziano et al. |
| 2015/0230453 A1 | 8/2015 | Fontes et al. |
| 2015/0246164 A1 | 9/2015 | Heaton et al. |
| 2015/0275176 A1 | 10/2015 | Kobayashi et al. |
| 2015/0342177 A1 | 12/2015 | Hassanein et al. |
| 2016/0113269 A1 | 4/2016 | Woodard et al. |
| 2016/0262634 A1 | 9/2016 | Steen et al. |
| 2016/0361476 A1 | 12/2016 | Huang |
| 2017/0000110 A1 | 1/2017 | Korkut et al. |
| 2017/0015963 A1 | 1/2017 | Ott |
| 2017/0042141 A1 | 2/2017 | Kay et al. |
| 2017/0049096 A1 | 2/2017 | Kay et al. |
| 2019/0021308 A1 | 1/2019 | Hassanein et al. |
| 2020/0128813 A1 | 4/2020 | Kay et al. |
| 2020/0337298 A1 | 10/2020 | Hassanein et al. |
| 2020/0352155 A1 | 11/2020 | Fishman et al. |
| 2021/0244017 A1 | 8/2021 | Ritchie et al. |
| 2022/0039373 A1 | 2/2022 | Hassanein et al. |
| 2022/0071197 A1 | 3/2022 | Hassanein et al. |
| 2022/0232823 A1 | 7/2022 | Hassanein et al. |
| 2023/0210104 A1 | 7/2023 | Hassanein |
| 2023/0263156 A1 | 8/2023 | Hassanein |

FOREIGN PATENT DOCUMENTS

| | | |
|---|---|---|
| CA | 2861545 A1 | 7/2013 |
| CA | 2521324 C | 12/2014 |
| CN | 1232723 A | 10/1999 |
| CN | 1269471 A | 10/2000 |
| CN | 2418882 Y | 2/2001 |
| CN | 1452863 A | 11/2003 |
| CN | 2616058 Y | 5/2004 |
| CN | 1849102 A | 10/2006 |
| CN | 103893205 A | 7/2014 |
| CN | 203724222 U | 7/2014 |
| CN | 104770361 A | 7/2015 |
| CN | 114375945 A | 4/2022 |
| DE | 4201259 A1 | 7/1993 |
| DE | 10121159 A1 | 11/2002 |
| DE | 102005048625 A1 | 4/2007 |
| EP | 0347923 | 12/1989 |
| EP | 0376763 | 7/1990 |
| EP | 1062870 B1 | 1/2003 |
| EP | 1488743 A2 | 12/2004 |
| EP | 1017271 B1 | 1/2006 |
| EP | 3347084 | 11/2020 |
| EP | 4032401 A1 | 7/2022 |
| FR | 2830183 A1 | 4/2003 |
| JP | S57-010695 U1 | 1/1982 |
| JP | 63270601 A | 11/1988 |
| JP | H02-282301 A | 11/1990 |
| JP | 02-306901 A | 12/1990 |
| JP | H03-74302 A | 3/1991 |
| JP | 04-099701 A | 3/1992 |
| JP | H04-128201 A | 4/1992 |
| JP | 06-056601 | 3/1994 |
| JP | 06-305901 | 11/1994 |
| JP | H07-196401 A | 8/1995 |
| JP | H08-89518 A | 4/1996 |
| JP | 08-511012 | 11/1996 |
| JP | 2001516768 A | 10/2001 |
| JP | 2003-206201 A | 7/2003 |
| JP | 2003-315220 A | 11/2003 |
| JP | 2004513889 A | 5/2004 |
| JP | 2004525290 A | 8/2004 |
| JP | 2004529938 A | 9/2004 |
| JP | 2008-515914 A | 5/2008 |
| JP | 2009-521931 A | 6/2009 |
| JP | 2010-525076 A | 7/2010 |
| JP | 2011-511000 A | 4/2011 |
| JP | 2016-053030 A | 4/2016 |
| JP | 6144238 B2 | 6/2017 |
| JP | 6625384 B2 | 12/2019 |
| JP | 6756775 B2 | 9/2020 |
| WO | WO-8805261 A1 | 7/1988 |
| WO | WO-9502326 A1 | 1/1995 |
| WO | WO-95/03680 A1 | 2/1995 |
| WO | WO-9531897 A1 | 11/1995 |
| WO | WO-9618293 | 6/1996 |
| WO | WO-9629865 A1 | 10/1996 |
| WO | WO-9722244 A1 | 6/1997 |
| WO | WO-9746091 A1 | 12/1997 |
| WO | WO-9915011 | 4/1999 |
| WO | WO-00/18226 A2 | 4/2000 |
| WO | WO-0022927 A1 | 4/2000 |
| WO | WO-200027189 A1 | 5/2000 |
| WO | WO-00/35340 A1 | 6/2000 |
| WO | WO-0060936 A1 | 10/2000 |
| WO | WO-200101774 A1 | 1/2001 |
| WO | WO-0226034 A2 | 4/2002 |
| WO | WO-02/35929 A1 | 5/2002 |
| WO | WO-02089571 A1 | 11/2002 |
| WO | WO-2003026419 A1 | 4/2003 |
| WO | WO-2004017838 | 3/2004 |
| WO | WO-2004026031 A2 | 4/2004 |
| WO | WO-2006042138 A2 | 4/2006 |
| WO | WO-2006060309 | 6/2006 |
| WO | WO-2006076590 A2 | 7/2006 |
| WO | WO-2006124820 A2 | 11/2006 |
| WO | WO-2007079185 A2 | 7/2007 |
| WO | WO-2007124044 A2 | 11/2007 |
| WO | WO-2008106724 A1 | 9/2008 |
| WO | WO-2008108996 A1 | 9/2008 |
| WO | WO-08150587 A2 | 12/2008 |
| WO | WO-2009/099939 A2 | 8/2009 |
| WO | WO-2011002926 A2 | 1/2011 |
| WO | WO-2011072012 A2 | 6/2011 |
| WO | WO-2012142487 A1 | 10/2012 |
| WO | WO-2012148685 | 11/2012 |
| WO | WO-2013068751 | 5/2013 |
| WO | WO-2013068752 A2 | 5/2013 |
| WO | WO-2013068753 | 5/2013 |
| WO | WO-2013106908 A1 | 7/2013 |
| WO | WO-2014011547 A2 | 1/2014 |
| WO | WO-2014059316 A1 | 4/2014 |
| WO | WO-2014194349 A1 | 12/2014 |
| WO | WO-2015126853 A1 | 8/2015 |
| WO | WO-2015143552 A1 | 10/2015 |
| WO | WO-2015154170 A1 | 10/2015 |
| WO | WO-2015154193 A1 | 10/2015 |
| WO | WO-2015187737 | 12/2015 |
| WO | WO-2016090498 A1 | 6/2016 |
| WO | WO-2017044465 | 3/2017 |
| WO | WO-2017205967 A1 | 12/2017 |

OTHER PUBLICATIONS

Gever et al. "Technique to Repair Damaged Donor Lungs for Graft Passes Clinical Test" Medpage Today (Year: 2008).*
Wei et al. "Protective Effect of Specific Phosphodiesterease Inhibitor Milrinone for Donor Lung" Chinese Journal of New Drugs, vol. 16, Nov. 21, 2007.*
Keshavjee et al. "The role of dextran 40 and potassium in extended hypothermic lung preservation for transplantation." J. Thorac Cardiovasc Surg. Feb. 1992; 103(2): 314-25, (Year: 1992).*
"2002 Design & Engineering Awards, Portable Organ Preservation System", Science (2002) (1 page).
"Celsior™ Cold Storage Solution", Sangstat Medical Corporation (internet reference) (1999) (5 pages).
"Heart Kept Beating Outside Body," Associated Press, CNN.com (2001).
"History of Transplantation and Organ Preservation," Barr Laboratories, Inc. (internet reference) (2004).

(56) References Cited

OTHER PUBLICATIONS

"Human heart beats on its own outside body", USA Today (2001) (1 page).
"Human Heart Kept Alive Outside Body for First Time in Study of Portable Organ Preservation System™ at University of Pittsburgh Medical Center", UPMC, McGowan Institute for Regenerative Medicine (2001) (2 pages).
"Machine Keeps Human Kidney Alive for 24-Hours," www.worldhealth.net, Aug. 25, 2001.
"Machine May Be Organ Transplant Breakthrough," USA Today (2001).
"New Discovery in Organ Transplantation," MSNBC, 2001 (1 pages).
"The Nation: Warm-Storage Device May Aid Organ Transplants", Dow Jones Publications Library (2001) (1 page).
"ViaSpan (Belzer UW) Cold Storage Solution," Barr Laboratiories, Inc. (2002) (2 pages).
"Warm storage for donor organs", University of Chicago Magazine (2001) (1 page).
Ahmad, N. et al., "A pathophysiologic study of the kidney tubule to optimize organ preservation solutions", Kidney International 66(1):77-90 (2004), 14 pages.
Aitchison, J.D. et al., "Functional assessment of non-heart-beating donor lungs: prediction of post-transplant function", European Journal of Cardio-thoracic Surgery, 20:187-194 (2001) (8 pages).
Aitchison, J.D. et al., "Nitric Oxide During Perfusion Improves Posttransplantation Function of Non-Heart-Beating Donor Lungs", Transplantation, 75(12):1960-1964, Jun. 27, 2003, 5 pages.
Ananthaswamy "Machine Keeps Organs Alive for Longer," New Scientist.com (2001).
Andreasson, et al., "Ex vivo lung perfusion in clinical lung transplantation—State of the art", European Journal of Cardio-Thoracic Surgery, 46:779-788, 2014 (10 pages).
Aoki, M. et al., Anti-CD18 Attenuates Deleterious Effects of Cardiopulmonary Bypass and Hypothermic Circulatory Arrest in Piglets, J. Card. Surg. 10(Suppl):407-17 (1995) (11 pages).
Asparagine, Encyclopedia.com, https://www.encyclopedia.com/science-and-technology/biochemistry/biochemistry/asparagine, accessed May 7, 2022 (3 pages).
Baker, L.E. et al., "Artificial Maintenance Media for Cell and Organ Cultivation", Journal of Experimental Medicine, 70:29-38, Jul. 1, 1939 (15 pages).
Bando et al. Oxygenated Perfluorocarbon, Recombinant Human Superoxide Dismutase, and Catalase Ameliorate Free Radical Induced Myocardial Injucy During Heart Preservation and Transplantation. J Thorac Cardiovasc Surg. 96:930-8(Dec. 1988).
Barinov, E.F., "Hormonal-metabolic disturbances during biological preservation of the heart", Fiziologicheskii Zhurnal (Kiev), 29(3):293-299 (1983) (8 pages)—Russian Language with English Abstract.
Becker, et al., "Evaluating acellular versus cellular perfusate composition during prolonged ex vivo lung perfusion after initial cold ischaemia for 24 hours", Transplant International, 29:88-97, 2016, published online Aug. 27, 2015 (10 pages).
Belzer, F.O., "Formula for Belzer MPS Solution", University of Wisconsin-Madison Organ Preservation, (<http://www.surgery.wisc.edu/transplat/research/southard/BelzerMPS.shtml>) (Oct. 3, 2003) (2 pages).
Benichou et al. Canine and Human Liver Preservation for 6 to 18 Hr by Cold Infusion. Transplantation. 24(6):407-411(Dec. 1977).
Birkett, D. et al., "The Fatty Acid Content and Drug Binding Characteristics of Commercial Albumin Preparations", Clinica Chimica Acta 85:253-258 (1978), 6 pages.
Blanchard et al. Techniques for Perfusion and Storage of Heterotopic Heart Transplants in Mice. Microsurgery. 6:169-174(1985).
Boggi, U. et al., "Pancreas Preservation with University of Wisconsin and Celsior Solutions", Transplant Proceedings 36(3):563-565 (2004), 3 pages.

Boggi, U. et al., "Pancreas Preservation With University of Wisconsin and Celsior Solutions: A Single-Center, Prospective, Randomized Pilot Study", Transplantation 27:77(8):1186-1190 (2004), 5 pages.
Botha, P., "Extended Donor Criteria in Lung Transplantation", Current Opinion in Organ Transplantation, 14:206-210, 2009 (5 pages).
Boyle, Jr. et al. Ischemia-Reperfusion Injury. Ann. Thorac. Surg. 64:524-30 (1997).
Brandes, H. et al. "Influence of High Molecular Dextrans on Lung Function in an ex Vivo Porcine Lung Model," Journal of Surgical Research, 101:2, 225-231 (2001) (7 pages).
Brasile, L. et al., "Organ Preservation Without Extreme Hypothermia Using an Oxygent™ Supplemented Perfusate", Art. Cells, Blood Subs., and Immob. Biotech., 22(4):1463-68 (1994), 6 pages.
Burt et al., "Myocardial Function After Preservation for 24 Hours," Jour. Thorac. and Cardiovascular Surg. 92(2):238-46 (1986).
Calhoon et al. Twelve-Hour Canine Heart Preservation With a Simple, Portable Hypothermic Organ Perfusion Device. Ann. Thorac. Surg. 62:91-3 (1996).
Canelo R, et al.; "Experience with Hystidine Tryptophan Ketoglutarate Versus University Wisconsin Preservation Solutions in Transplantation," Int Surg. 88(3):145-51 (2003).
Carrier, B., "Chapter 4: Hypoxia and Oxygenation", Alaska Air Medical Escort Training Manual, Fourth Edition, pp. 71-82, 2006, 12 pages.
Chambers, D.J. et al., "Long-Term Preservation of the Heart: The Effect of Infusion Pressure During Continuous Hypothermic Cardioplegia", The Journal of Heart and Lung Transplantation, 11(4):665-75 (1992), 11 pages.
Chen, E. P. et al., "Milrinone Improves Pulmonary Hemodynamics and Right Ventricular Function in Chronic Pulmonary Hypertension", Ann Thorac Surg, 63:814-821, 1997 (8 pages).
Chen, F. et al., "Development of New Organ Preservation Solutions in Kyoto University", Yonsei Medical Journal, 46(6):1107-40 (2004), 8 pages.
Chien et al. Canine Lung Transplantation After More Than Twenty-four Hours of Normothermic Preservation. J. Heart Lung Transplant. 16:3340-51 (1997).
Chien, S. et al., "A simple technique for multiorgan preservation", The Journal of Thoracic and Cardiovascular Surgery, 95(1):55-61 (1988), 7 pages.
Chien, S. et al., "Functional Studies of the Heart During a 24-Hour Preservation Using a New Autoperfusion Preparation", The Journal of Heart and Lung Transplantation, 10(3):401-8 (1991), 8 pages.
Chinchoy, Edward Cheng-wey; "The Development, Refinement, and Uses of a Physiologically Working Isolated Ex Vivo Swine Heart Model", A thesis submitted to the Faculty of the Graduate School of the University of Minnesota, Dec. 1999 (136 pages).
Christophi, C. et al., "A Comparison of Standard and Rapid Infusion Methods of Liver Preservation During Multi-Organ Procurement", Aust. N.Z.J. Surg., 61(9):692-694 (1991), 3 pages.
Cimino, Adria, "Doctor develops device to preserve donated organs", Mass High Tech (2001), 2 pages.
Collins, BH "Organ Transplantation: What Is the State of the Art?," Ann Surg. 238(6 Suppl):S72-89 (2003).
Cronin et al., "Liver Transplantation at the University of Chicago," Clin Transpl. 231-8 (1999).
Cysteine, Encyclopedia.com, https://www.encyclopedia.com/science-and-technology/biochemistry/biochemistry/cysteine, accessed May 7, 2022 (4 pages).
Daemen, J.H.C. et al., "Short-term outcome of kidney transplants from non-heart-beating donors after preservation by machine perfusion", Transpl. Int. 9(Supp 1):S76-S80 (1996), 5 pages.
Definition of Examine, Merriam-Webster Dictionary on-line. www.merriam-webster.com/dictionary/examine, Printed Feb. 9, 2011, (1 page).
Demertzis, S. et al., "University of Wisconsin Versus St. Thomas' Hospital Solution for Human Donor Heart Preservation", Ann Thorac Surg 55:1131-7 (1993), 7 pages.
Den Butter, G. et al., "Comparison of solutions for preservation of the rabbit liver as tested by isolated perfusion", Transpl. Int. 8(6):466-471 (1995), 6 pages.

(56) References Cited

OTHER PUBLICATIONS

Denham, B.S. et al., "Twenty-Four Hour Canine Renal Preservation By Pulsatile Perfusion, Hypothermic Storage, and Combinations of the Two Methods", Transplantation Proceedings, 9(3):1553-1556 (1977), 4 pages.
Dobrian et al., "In vitro formation of oxidatively-modified and reassembled human low-density lipoproteins," Biochimica et Biophysica Acta (BBA) 1169:12-24 (1993).
Drexler, H. et al., "Effect of L-arginine on coronary endothelial function in cardiac transplant recipients. Relation to vessel wall morphology," Circulation 89(4):1615-1623 (1994) (10 pages).
Duarte, J.D. et al., "Pharmacologic treatments for pulmonary hypertension; exploring pharmacogenomics", Future Cardiol., 9(3):335-349, 2013 (15 pages).
Egan, T. M. et al., "Ex Vivo Evaluation of Human Lungs for Transplant Suitability", Ann Thorac Surg, vol. 81, No. 4, pp. 1205-1213 (Apr. 2006) (9 pages).
Eiseman et al., "A Disposable Liver Perfusion Chamber," Surgery 6:1163-66 (1966).
Engelman,R.M. et al., "Influence of Steroids on Complement and Cytokine Generation After Cardiopulmonary Bypass", Ann Thorac Surg 60(3):801-04 (1995) (4 pages).
European Commission, Scientific Committee on Food, "Opinion on Substances for Nutritional Purposes Which Have Been Proposed for Use in the Manufacture of Foods for Particular Nutritional Purposes ('Parnuts')", SCF/CS/ADD/NUT/20/Final, http://www.europa.eu.int/comm/dg24/health/sc/scf/index_en.html, Dec. 5, 1999 (19 pages).
European Extended Search Report issued in EP 16844964.3, dated Apr. 26, 2019 (7 pages).
European Extended Search Report issued in EP20206681.7, dated Apr. 26, 2021 (8 pages).
European Extended Search Report issued in European Patent Application No. 22158928.6. dated Jun. 29, 2022 (13 pages).
European Search Report for European Patent Application No. 08795820.3 dated Apr. 17, 2014 (6 pages).
European Search Report for European Patent Application No. 09707471.0 dated May 27, 2014. 7 pages.
European Search Report issued for European Application No. EP19204566.4, dated May 25, 2020 (7 pages).
European Search Report issued in EP12770852.7, dated Sep. 23, 2014, 8 pages.
Extended European Search Report issued in EP15803127.8, dated May 22, 2018 (14 pages).
Extended European Search Report issued in European Application No. 17172411.5, dated Nov. 8, 2017 (7 pages).
Fabregas, Luis, "UPMC tests machine to aid heart transplants", Pittsburg Tribune-Review (Feb. 24, 2002), (<http://www.pittsburghlive.com/x/pittsburghrib/print_19181.html>), 2 pages.
Faggian, G. et al., "Donor Organ Preservation in High-Risk Cardiac Transplantation", Transplantation Proceedings 36:617-619 (2004), 3 pages.
FDA Premarket Approval 510k (extracts), "Perfadex Solution for Lung Perfusion", dated Mar. 8, 2001 (61 pages).
FDA Premarket Approval 510k, "Perfadex with THAM", dated Oct. 9, 2008 (5 pages).
FDA Summary of Safety and Probable Benefit, "XVIVO Perfusion System (XPS) with STEEN Solution Perfusate", HUD Designation No. 08-0194, Notice of Approval dated Aug. 12, 2014 (52 pages).
Featherstone et al. "Comparison of Phosphodiesterase Inhibitors of Differing Isoenzyme Selectivity Addes to St. Thomas Hospital Cardioplegic Solution Used for Hypothermic Preservation of Rat Lungs." Am. J. Respir. Crit. Care Med. Mar. 2000. 162(3):850-856.
Fehrenberg, C. et al., "Protective Effects of B2 Preservation Solution in Comparison to a Standard Solution (Histidine-Tryptophan-Ketoglutarate/Bretschneider) in a Model of Isolated Autologous Hemoperfused Porcine Kidney", Nephron Physiol 96:52-58 (2004) (7 pages).
Ferrera et al. Comparison of Different Techniques of Hypothermic Pig Heart Preservation. Ann. Thorac. Surg. 57(5):1233-39 (1994).

File History for U.S. Appl. No. 60/616,835, filed Oct. 7, 2004 (82 pages).
File History for U.S. Appl. No. 60/694,971, filed Jun. 28, 2005 (280 pages).
File History for U.S. Appl. No. 60/725,168, filed Oct. 6, 2005 (699 pages).
Finn, A. et al., "Effects of Inhibition of Complement Activation Using Recombinant Soluble Complement Receptor 1 On Neutrophil CD11B/CD18 and L-Selectin Expression and Release of Interleukin-8 and Elastase in Simulated Cardiopulmonary Bypass", J Thorac Cardiovasc Surg 111(2):451-459 (1996), 9 pages.
Fisher, et al., "An observational study of Donor Ex Vivo Lung Perfusion in UK lung transplantation: DEVELOP-UK", Health Technology Assessment, vol. 20, No. 85, Nov. 2016 (310 pages).
Fourcade et al., "A New Method of Kidney Preservation with Collins' Solution," Biomed. 21(7):308-11 (1974).
Fraser, C.D. Jr. et al., "Evaluation of Current Organ Preservation Methods for Heart-Lung Transplantation", Transplantation Proceedings, 20(1 Suppl. 1):987-990 (1988), 4 pages.
Gever, J., "Technique to Repair Damaged Donor Lungs for Graft Passes Clinical Test", MedPage Today, https://www.medpagetoday.org/surgery/transplantation/12245, Accessed Jul. 11, 2020, dated Dec. 19, 2008 (4 pages).
Givertz, M.M. et al., "Effect of Bolus Milrinone on Hemodynamic Variables and Pulmonary Vascular Resistance in Patients With Severe Left Ventricular Dysfunction: A Rapid Test for Reversibility of Pulmonary Hypertension", JACC, 28(7):1775-1780, Dec. 1996 (6 pages).
Glucose, The Merck Index, 11th ed. Entry 4353 (pp. 699-700) (1989), 3 pages.
Glutamine, Encyclopedia.com, https://www.encyclopedia.com/science-and-technology/biochemistry/biochemistry/glutamine, accessed May 7, 2022 (7 pages).
Gohrbandt, B., et al., "Glycine intravenous donor preconditioning is superior to glycine supplementation to low-potassium dextran flush preservation and improves graft function in a large animal lung transplantation model after 24 hours of cold ischemia", The Journal of Thoracic and Cardiovascular Surgery, 131(3):724-729, Mar. 2006 (6 pages).
Grynberg, A. et al., "Fatty Acid Oxidation in the Heart", Journal of Cardiovascular Pharmacology, 28(Suppl. 1):S11-S17 (1996) (8 pages).
Guarrera, J.V. et al., "Pulsatile Machine Perfusion With Vasosol Solution Improves Early Graft Function After Cadaveric Renal Transplantation", Transplantation 77(8):1264-1268 (2004), 5 pages.
Gundry, S.R. et al., "Successful Transplantation of Hearts Harvested 30 Minutes After Death From Exsanguination", Ann Thorac Surg 53(5):772-775 (1992), 4 pages.
Habazetti, H. et al., "Improvement in Functional Recovery of the Isolated Guinea IG Heart After Hyperkalemic Reperfusion With Adenosine", J Thorac Cardiovasc Surg 111(1):74-84 (1996) (11 pages).
Hachida, M. et al., Abstract "Efficacy of myocardial preservation using HTK solution in continuous 120 min cross-clamping method—a comparative study with GIK method", Nippon Kyobu Geka Gakkai Zasshi. 41(9):1495-1501 (1993), 1 page.
Hai, Human Body Atlas, First Edition, Liaoning Science and Technology Publishing House, p. 120, Oct. 31, 2011 (3 pages)—with English Translation.
Han, B. et al., "Study on the clinical efficacy of specific phosphodiesterase inhibitor in patients with pulmonary hypertension due to left heart disease", Experimental and Therapeutic Medicine, 16:1175-1186, 2018 (12 pages).
Hardesty, R.L. et al., Original Communications, "Autoperfusion of the heart and lungs for preservation during distant procurement", J Thorac Cardiovasc Surg, 93:11-18 (1987) (8 pages).
Hartman, J. C. The Role of Bradykinin and Nitric Oxide in the Cardioprotective Action of ACE Inhibitors. Ann. Thor. Surg. 60:789-92 (1995).
Hassanein, W.H. et al., "A Novel Approach for 12 Hour Donor Heart Preservation, Presented at the 70th Scientific Sessions of The American Heart Association", Abstract was published in Circulation (1997), 1 page.

(56) References Cited

OTHER PUBLICATIONS

Hassanein, W.H. et al., "Continuous Perfusion of Donor Hearts in the Beating State Extends Preservation Time and Improves Recovery of Function", The Journal of Thoracic and Cardiovascular Surgery, pp. 821-830 (1998), 10 pages.

Heil, J.E. et al., "A Controlled Comparison of Kidney Preservation by Two Methods: Machine Perfusion and Cold Storage", Transplantation Proceedings 19(1):2046 (1987), 1 page.

Hoeper, M.M. et al., "Intensive Care Unit Management of Patients with Severe Pulmonary Hypertension and Right Heart Failure", Am J Respir Crit Care Med, 184:1114-1124, 2011 (11 pages).

Howarth, F.C. et al., "Effects of extracellular magnesium and beta adrenergic stimulation on contractile force and magnesium mobilization in the isolated rat heart", Magnesium Research, 7:187-197, 1994 (13 pages).

Hui-Li, G. "The Management of Acute Pulmonary Arterial Hypertension", Cardiovascular Therapeutics, 29:153-175, 2011 (23 pages).

Hülsmann et al. "Loss of cardiac contractility and severe morphologic changes by acutely lowering the pH of the perfusion medium: protection by fatty acids," BBAGEN 20256, Biochimica et Biophysica Acta., 1033:214-218 (1990) (5 pages).

Ida, K. "Titanium for Medical and Dental Use", Japanese journal of medical electronics and biological engineering, 24(1):47-54, 1986 (12 pages)—with English Summary.

Imber et al.; "Advantages of Normothermic Perfusion Over Cold Storage in Liver Preservation," Transplantation 73(5):701-09 (2002).

Ingemansson, et al., "Importance of Calcium in Long-Term Preservation of the Vasculature", Ann Thorac Surg, 61:1158-1162, 1996 (5 pages).

International Search Report and Written Opinion for International Application No. PCT/US2012/033626 dated Sep. 20, 2012 (12 pages).

International Search Report and Written Opinion issued by the U.S. Patent and Trademark Office as Searching Authority, in International Application No. PCT/US16/50512, dated Dec. 12, 2016 (9 pages).

International Search Report, issued by the European Patent Office as Searching Authority, in PCT/US07/009652 International Search Report, dated Apr. 18, 2008, 5 pages.

International Search Report, issued by the European Patent Office as Searching Authority, issued in PCT/US98/19912, dated May 3, 1999 (4 pages).

International Search Report, issued by the U.S. Patent Office as Searching Authority, issued in PCT/US08/61454 International search report dated Dec. 5, 2008 (3 pages).

International Search Report, issued by the U.S. Patent Office as Searching Authority, issued in PCT/US09/032619, dated Jun. 4, 2009 (4 pages).

Janßen, H. et al., "UW is Superior to Celsior and HTK in the Protection of Human Liver Endothelial Cells Against Preservation Injury", Liver Transplantation, 10(12):1514-1523 (2004), 10 pages.

Jaski, B.E. et al., "Positive inotropic and vasodilator actions of milrinone in patients with severe congestive heart failure. Dose-response relationships and comparison to nitroprusside", J. Clin Invest., 75(2):643-649, 1985 (8 pages).

Jirsch, D.W. et al., "Ex Vivo Evaluation of Stored Lungs", The Annals of Thoracic Surgery, 10(2):163-168, Aug. 1970 (6 pages).

Johnson, Kerry et al: "POPS: Portable Organ Preservation System." UPMC Health System and TransMedics, Inc. Tribune Review (No date) 1 page.

Johnston, R., "What's Normal About DLCO?", PFT Blog, Jan. 1, 2014 (17 pages).

Kawakami, et al., "Successful Preservation of the Isolated Canine Heart for 24 Hours by Low Pressure-Low Temperature Continuous Perfusion", Japanese Annals of Thoracic Surgery, Japan, 7(6):543-547, Dec. 25, 1987 (13 pages)—English Translation.

Kawamura, T. et al., "Long-Term Preservation of Canine Pancreas By a New Simple Cold Storage Method Using Perfluorochemical—The Two-Layer Cold Storage Method (Euro-Collins' Solution/Perfluorochemical)-", Kobe J. Med. Sci., 38(2):135-145 (1992), 11 pages.

Kelly "Current Strategies in Lung Preservation," J. Lab Clin. Med. 136:427-40 (2000).

Keshavjee, S.H. et al., "A method for safe twelve-hour pulmonary preservation", J Thorac Cardiovasc Surg, 98:529-534 (1989), 6 pages.

Kioka, Y. et al., "Twenty-Four-Hour Isolated Heart Preservation by Perfusion Method With Oxygenated Solution Containing Perfluorochemicals and Albumin", The Journal of Heart Transplantation, 5:437-443 (1986), 7 pages.

Koike, et al., "An Experimental Study on the Hypothermic Preservation of the Rabbit Heart Using Glucose-Insulin-Potassium Solution—Intermittent Perfusion Method Versus Simple Immersion Method", Japanese Annals of Thoracic Surgery, 7(6):527-532, Dec. 25, 1987 (16 pages)—English Translation.

Kozaki, K. et al., "Usefulness of a Combination of Machine Perfusion and Pentoxifylline for Porcine Liver Transplantation From Non-Heart-Beating Donors With Prolonged Hypotension", Transplantation Proceedings, 29:3476-3477 (1997), 2 pages.

Kubono, K. et al., "Examination of Plasma and Corpuscle Adenosine Concentration in Normal Subject by Radioimmunoassay, Rinshou Kagaku (Clinical Chemistry", 20(2):72-77, Jun. 1991 (6 pages)—Japanese Language.

Kuroda, Y. et al., "A New, Simple Method for Cold Storage of the Pancreas Using Perfluorochemical", Transplantation, 46(3):457-460 (1988), 4 pages.

Lasley et al. Protective Effects of Adenosine in the Reversibly Injured Heart. Ann. Thorac. Surg. 60(3):843-46 (1995).

Lawrence, C., "Machine preserves organs outside body," Chicago Sun Times (2001), 1 page.

Lefer, A.M. Attenuation of Myocardial Ischemia-Reperfusion Injury With Nitric Oxide Replacement Therapy. Ann. Thorac. Surg. 60(3):847-51 (1995).

Li, G. et al., "Functional Recovery in Rabbit Heart after Preservation with a Blood Cardioplegic Solution and Perfusion," J Heart Lung Transplant, 12(2)263-270 (1993) (8 pages).

Li, X. et al., "Insulin in University of Wisconsin Solution Exacerbates the Ischemic Injury and Decreases the Graft Survival Rate in Rat Liver Transplantation", Transplantation, 15:76(1):44-49 (2003), 6 pages.

Liu,J. et al., "Annexin V Assay-proven Anti-apopotic Effect of Ascorbic Acid 2-glucoside after Cold Ischemia/Reperfusion Injury in Rat Liver Transplantation", Acta Med. Okayama, 57(5):209-216 (2003), 8 pages.

Lobato, E.B. et al., "Treatment with phosphodiesterase inhibitors type III and V: milrinone and sildenafil is an effective combination during thromboxane-induced acute pulmonary hypertension", British Journal of Anaesthesia, 96(3):317-322, 2006 (6 pages).

Loor, et al., "Prolonged EVLP Using OCS Lung: Cellular and Acellular Perfusates", Author Manuscript published in final edited form as Transplantation, 101(10):2303-2311, Oct. 2017 (20 pages).

Macchiarini, P. et al. "Ex Vivo Lung Model of Pig-To-Human Hyperacute Xenograft Rejection", The Journal of Thoracic and Cardiovascular Surgery, 114:3, 315-325 (1997) (11 pages).

Mankad et al. Endothelial dysfunction caused by University of Wisconsin preservation solution in the rat heart. J. Thorac. Cardiovasc. Surg. 104(6):1618-24 (1992).

Matsuno, N. et al., "Effectiveness of Machine Perfusion Preservation as a Viability Determination Method for Kidneys Procured from Non-Heart-Beating Donors," Transplantation Proceedings, 26(4):2421-2422 (1994) (2 pages).

Matsuno, N. et al., "The Effect of Machine Perfusion Preservation Versus Cold Storage On the Function of Kidneys From Non-Heart-Beating Donors", Transplantation, 57(2):293-294 (1994) (2 pages).

Menasche et al. Experimental evaluation of Celsior.RTM., a new heart preservation solution. Eur. J. Cardiothor. Surg. 8:207-13 (1994).

Menasche et al. Improved Recovery of Heart Transplants With a Specific Kit of Preservation Solutions. J. Thorac. Cardiovasc. Surg. 105(2):353-63 (1993).

(56) References Cited

OTHER PUBLICATIONS

Menasché, P., "The inflammatory response to cardiopulmonary bypass and its impact on postoperative myocardial function", Current Opinion in Cardiology, 10:597-604 (1995) (8 pages).
Moisiuk, Y. et al., "Histidine-Tryptophan-Ketoglutarate Versus Euro-Collins for Preservation of Kidneys From Non-Heart-Beating Donors", Transplantation Proceedings, 28(1):202 (1996) (1 page).
Moller-Pedersen et al.; "Evaluation of Potential Organ Culture Media for Eye Banking Using Human Donor Corneas," Br J Ophthamol. 85(9):1075-79 (2001).
Morimoto et al., A Simple Method for Extended Heart-Lung Preservation by Autoperfusion. Trans Am Soc Artif Intern Organs. 30:320-24 (1984).
Munshi, et al., "Donor management and lung preservation for lung transplantation", Lancet Respir Med, 1:318-328, published online Feb. 20, 2013 (11 pages).
Nicholson, M.L. et al., "A Comparison of Renal Preservation by Cold Storage and Machine Perfusion Using a Porcine Autotransplant Model", Transplantation 78(3):333-337 (2004), 5 pages.
No Author Listed, "CUSTODIOL® HTK Solution for Multi-Organ Protection", Saudi Center for Organ Transplantation, Date Unknown, originally cited to U.S. Patent Office Jun. 30, 2014, in U.S. Appl. No. 12/892,451 (2 pages).
No Author Listed, "SOLTRAN Kidney perfusion fluid", Baxter, No Month Listed—2001-2004 (1 page).
No Author Listed, "The comprehensive resource for physicians, drug and illness information", VIASPAN™ DuPont Pharma Cold Storage Solution, Date Unknown (3 pages).
No Author Listed, "UW Solution Composition", DuPont Pharmaceutical, Date Unknown (1 page).
No Author Listed. "Custodiol HTK" Physicians' Desk Reference, 57th Edition, Thomson PDR. ISBN:1-56363-445-7. No Month Listed—2003 (3 pages).
Odagiri, S. et al., "Pusatile Assist Device: New Pulsatile Pump Using Pulsatile Assist Device-Hemodynamic Comparison of Pulsatile V-A Bypass (VABP), Pulsatile Left Heart Bypass (LHBP) and Constant Flow Left Heart Bypass (LHB)", Journal of Japan Surgical Society, 83(6):515-523, Jun. 1982, 12 pages—English Abstract.
Opelz et al., "Comparative Analysis of Kidney Preservation Methods. Collaborative Transplant Study," Transplant Proc. 28(1):87-90 (1996).
Opelz, G. et al., "Advantage of Cold Storage Over Machine Perfusion for Preservation of Cadaver Kidneys", Transplantation, 33(1):64-68 (1982), 5 pages.
Open Anesthesia—Milrinone: pharmacology, https://www.openanesthesia.org/milrinone_pharmacology/, accessed 2019 (3 pages).
Ota, K. et al., "Artificial Organ", Current State and Future of Substitution of Functions, pp. 150-151, 1983 (7 pages)—English Translation.
Pearl, J.M. et al., Loss of endothelium-dependent vasodilatation and nitric oxide release after myocardial protection with University of Wisconsin solution, Cardiovascular Surgery 107(1):257-264 (1994) (8 pages).
Pego-Fernandes, et al., "Ex vivo lung perfusion: initial Brazilian experience", J. Bras. Pneumol., 35(11):1107-1112, 2009 (6 pages).
Perfadex Guidelines, NHS Cardiothoracic Advisory Group (CTAG), Mar. 2016 (2 pages).
Petrovsky et al., Justification and Application of a New Method for Transorganic Oxygen Preservation of the Kidneys. Vestn Akad Med Nauk SSSR. (2):69-82(1989)—English Abstract—15 pages.
Pinsky, D. et al., "Restoration of the cAMP Second Messenger Pathway Enhances Cardiac Preservation for Transplantation in a Heterotopic Rat Model", J. Clin. Invest. 92(6):2944-3002 (1993) (9 pages).
Ploeg et al. Successful 72-Hour Cold Storage of Dog Kidneys With UW Solution. Transplantation 46(2):191-96 (1988).
Pokorny, H. et al., "Histidine-tryptophan-ketoglutarate solution for organ preservation in human liver transplantation—a prospective multi-centre observation study", Transpl Int 17(5):256-260 (2004), (5 pages).

Poston, R.S. et al., "Optimizing Donor Heart Outcome After Prolonged Storage With Endothelial Function Analysis and Continuous Perfusion", Ann Thorac Surg, 78:1362-1370, 2004 (9 pages).
Potdar et al.; "Initial Experience Using Histidine-Tryptophan-Ketoglutarate Solution in Clinical Pancreas Transplantation," Clin. Transplant. 18(6):661-65 (2004).
Pozniak, A., "Keeping Hearts Alive Doctors Develop a High-Tech System to Salvage Donated Organs", ABC News.com, (Dec. 7, 2001) (<http://abcnews.go.com/print?id=117085>), (2 pages).
Probst, R. et al. "Carbohydrate and fatty acid metabolism of cultured adult cardiac myocytes", Am. J. Physiol. 250 (Heart, Circ. Physiol. 19):H853-H860 (1986) (8 pages).
Pruitt, "Pharmacological Treatment of Respiratory Disorders", RT Magazine, http://www.rtmagazine.com/2007/05/pharmacological-treatment-of-respiratory-disorders, May 3, 2007, accessed Jan. 1, 2019 (6 pages).
Rao, M.V. et al., "Magnesium Sulfate: Chemical and Technical Assessment", MgSO4 (CTA), 2007 (5 pages).
Rao, V. et al., "Donor Blood Perfusion Improves Myocardial Recovery After Heart Transplantation", J. Heart Lung Transplant. 16(6):667-673 (1997) (7 pages).
Reddy, S.P. et al., "Preservation of Porcine Non-Heart-Beating Donor Livers By Sequential Cold Storage and Warm Perfusion", Transplantation, 77(9):1328-1332 (2004), 5 pages.
Rega, et al., "Long-term Preservation With Interim Evaluation of Lungs From a Non-Heart-Beating Donor After a Warm Ischemic Interval of 90 Minutes", Annals of Surgery, 238(6):782-793, Dec. 2003 (12 pages).
Richens et al. Clinical Study of Crystalloid Cardioplegia vs Aspartate-Enriched Cardioplegia Plus Warm Reperfusion for Donor Heart Preservation. Transplant. Proc. 24(1):1608-10 (1993).
Rinder, C. et al., "Blockade of C5a and C5b-9 Generation Inhibits Leukocyte and Platelet Activation during Extracorporeal Circulation", J. Clin. Invest. 96:3(1564-1572) 1995 (9 pages).
Rosenkranz, E.R., "Substrate Enhancement of Cardioplegic Solution: Experimental Studies and Clinical Evaluation", Ann Thorac Surg 60:797-800 (1995) (4 pages).
Rossi, L. et al., "Innovations—report: New organ preservation solution easier to use", (<http://www.innovations-report.com/html/reports/medicine_report-18854.html>), Feb. 6, 2003 (2 pages).
Rossi, L., "Portable Organ Preservation System™ Keeps Human Heart Alive Outside Body", PITT Campaign Chronicle (Oct. 7, 2001), 2 pages.
Russell, H.E., Jr. et al., "An Evaluation of Infusion Therapy (Including Dextran) for Venous Thrombosis", Circulation, 33:839-846, Jun. 1966 (8 pages).
Sato, H. et al., "Supplemental L-Arginine During Cardioplegic Arrest and Reperfusion Avoids Regional Postischemic Injury", J Thorac Cardiovasc Surg 110(2):302-314 (1995), 13 pages.
Schmid, T. et al., "The Use of Myocytes as a Model for Developing Successful Heart Preservation Solutions", Transplantation 52(1):20-26 (Jul. 1991) (7 pages).
Schon et al.; "Liver Transplantation After Organ Preservation with Normothermic Extracorporeal Perfusion," Ann Surg. 233(1):114-23 (2001).
Schwalb et al. New Solution for Prolonged Myocardial Preservation for Transplantation. J. Heart Lung Transplant. 17(2):222-29 (1998).
Seccombe et al. Coronary Artery Endothelial Function After Myocardial Ischemia and Reperfusion. Ann. Thorac. Surg. 60(3):778-88 (1995).
Segel et al. Posttransplantation Function of Hearts Preserved with Fluorochemical Emulsion. J. Heart Lung Transplant. 13(4):669-80 (1994).
Segel, L.D. et al., "Recovery of Sheep Hearts After Perfusin Preservation or Static Storage with Crystalloid Media", The Journal of Heart and Lung Transplantation, 17:211-221 (1998) (11 pages).
Sekine, M. et al., "Effect of Obese and Aging on Blood Fatty Acid Consumption in Japanese", Bulletin of the Graduate School of Human Life Science, Showa Women's University, 4:63-70, 1995 (8 pages)—English Abstract.
Semat, H. and Katz, R., "Physics, Chapter 9: Hydrodynamics (Fluids in Motion)", Hydrodynamics. University of Nebraska—Lincoln. Pap143. No Month Listed 1958 (18 pages).

(56) References Cited

OTHER PUBLICATIONS

Shimokawa, S. et al., "A New Lung Preservation Method of Topical Cooling by Ambient Cold Air: An Experimental Study", Transplantation Proceedings, 23 (1):653-654 (1991) (2 pages).

Shirakura, R. et al., "Multiorgan Procurement from Non-Heart-Beating Donors by use of Osaka University Cocktail, Osaka Rinse Solution, and the Portable Cardiopulmonary Bypass Machine", Transplantation Proceedings, 25(6):3093-3094 (1993) (2 pages).

Siobal, M.S. "Pulmonary Vasodilators", Respir Care, 52(7):885-899, Jul. 2007 (15 pages).

Southard, J., "The Right Solution for Organ Preservation", Business Briefings: Global Surgery 79-84 (2004) (6 pages).

Steen Solution, Consultation Procedure Public Assessment Report (CPAR), European Medicines Agency, EMEA/CHMP/329441/2005, Aug. 8, 2012 (20 pages).

Steen, S. et al., "Transplantation of lungs from non-heart-beating donors after functional assessment ex vivo", Ann Thorac Surg, 76:244-252, 2003, 11 pages.

Stubenitsky et al., "Kidney Preservation in the Next Millennium," Transpl. Int. 12:83-91 (1999).

Sunamori et al. Relative Advantages of Nondepolarizing Solution to Depolarizing University of Wisconsin Solution in Donor Heart Preservation. Transplant. Proc. 25(1):1613-17 (1993).

Synchrony Definition, http://dictionary.reference.com/browse/synchrony, Random House Unabridged Dictionary, 2006 (1 page).

Tang et al., "Warm Ischemia Lung Protection with Pinacidil: an ATP Regulated Potassium Channel Opener," Ann Thorac Surg. 76:385-9 (2003).

Tesi, R.J. et al., Pulsatile Kidney Perfusion for Preservation and Evaluation: Use of High-Risk Kidney Donors to Expand the Donor Pool, Transplantation Proceedings, 25(6):3099-3100 (1993) (2 pages).

Turpin, B.P. et al., "Perfusion of Isolated Rat Adipose Cells", The Journal of Clinical Investigation, 60:442-448 (1977), 7 pages.

U.S. Food and Drug Administration, Center for Drug Evaluation and Research, "Drugs@FDA—Solu-Medrol: Label and Approval History", (Available online at http://www.accessdata.fda.gov/scripts/cder/drugsatfda/index.cfm?fuseaction=Search.Label_ApprovalHistory#apphist . . . ), accessed Feb. 9, 2010 (3 pages).

U.S. Food and Drug Administration, Center for Drug Evaluation and Research, "Drugs@FDA—Solu-Medrol: Drug Details", (Accessible online at http://www.accessdata.fda.gov/scripts/cder/drugsatfda/index.cfm?fuseaction=Search.DrugDetails . . . ), accessed Feb. 9, 2010 (1 page).

Venuta, F. et al., "History of lung transplantation", Journal of Thoracic Disease, 9(12):5458-5471, Dec. 2017 (14 pages).

Vinten-Johansen et al. Reduction in Surgical Ischemic-Reperfusion Injury With Adenosine and Nitric Oxide Therapy. Ann. Thorac. Surg. 60(3):852-57 (1995).

Voiglio, E. et al. "Rat Multiple Organ Blocks: Microsurgical Technique of Removal for Ex Vivo Aerobic Organ Preservation Using a Fluorocarbon Emulsion", Microsurgery 20:3, 109-115 (2000) (7 pages).

Wallinder, et al., "Transplantation of initially rejected donor lungs after ex vivo lung perfusion", Cardiothoracic Transplantation, 144(5):1222-1228, Nov. 2012 (7 pages).

Watanabe, S. et al., "Effects of free fatty acids on the binding of bovine and human serum albumin with steroid hormones", Biochimica et Biophysica Acta (BBA), 1289:385-396 (1996), 12 pages.

Wei, Y. et al., "Protective Effect of Specific Phosphodiesterase Inhibitor Milrinone for Donor Lungs", Chinese Journal of New Drugs, 16(21):1762-1765, 2007—English Translation issued by U.S. Patent and Trademark Office, Aug. 2020 (17 pages).

Wei, Z., et al., "A Study on the Preservation of Rat Kidney with HX-III Solution", J WCUMS, 31(3):347-349 (2000)—English Abstract, 4 pages.

Wicomb, W. et al., "Orthotopic transplantation of the baboon heart after 20 to 24 hours' preservation by continuous hypothermic perfusion with an oxygenated hyperosmolar solution", J. Thorac Cardiovasc Surg, 83(1):133-140 (1982), 8 pages.

Wicomb, W.N. et al., "24-Hour Rabbit Heart Storage With UW Solution", Transplantation, 48(1):6-9 (1989), 4 pages.

Wicomb, W.N. et al., "Cardiac Transplantation Following Storage of the Donor Heart by a Portable Hypothermic Perfusion System", The Annals of Thoracic Surgery, 37(3):243-248 (1984), 6 pages.

Wright, N. et al. "A porcine ex vivo paracorporeal model of lung transplantation", Laboratory Animals Ltd. Laboratory Animals, 34:1, 56-62 (2000) (7 pages).

XVIVO Perfusion, RedEye Equity Research, May 29, 2020 (3 pages).

Yang, W. et al., "Effect of Hypoxia and Reoxygenation on the Formation and Release of Reactive Oxygen Species by Porcine Pulmonary Artery Endothelial Cells", Journal of Cellular Physiology, 164:414-423 (1995) (10 pages).

Yeung, J., et al., "Physiologic assessment of the ex vivo donor lung for transplantation", Journal of Heart and Lung Transplantation, 31(10):1120-1126, Oct. 2012 (7 pages).

Yland, M.J. et al., "New Pulsatile Perfusion Method for Non-Heart-Beating Cadaveric Donor Organs: A Preliminary Report", Transplantation Proceedings, 25(6):3087-3090 (1993), 4 pages.

Yokoyama, H. et al., "Isolated Dog Hearts Prepared in Cold Tyrode Solution and Reperfused with Arterial Blood Are Functionally and Ultrastructurally Normal", The Tohoku Journal of Experimental Medicine, 156:121-134, 1988 (14 pages).

Zalewska, et al., National Standards for Organ Retrieval from Deceased Donors (extracts), NHS Blood and Transplant, UK National Health Service, MPD1043/8, effective date Oct. 15, 2018 (50 pages).

Zhang et al., "Research Progress on Preservation of Severed Limbs," Chinese Journal of Reparative and Reconstructive Surgery 14(3):189-192 (2000).

Keshavjee, S.H. et al., "The role of dextran 40 and potassium in extended hypothermic lung preservation for transplantation", Journal of Thoracic and Cardiovascular Surgery, 103(2):314-325, Feb. 1992 (12 pages).

Saez, D.G. et al., "Evaluation of the Organ Care System in Heart Transplantation With an Adverse Donor/Recipient Profile", Ann. Thorac. Surg., 98:2099-2106, 2014 (8 pages).

Shimokawa, S. et al., "A New Lung Preservation Method of Topical Cooling by Ambient Cold Air Combined with High-Frequency Oscillation: An Experimental Study", Transplantation Proceedings, 26(4):2364-2366, Aug. 1994 (3 pages).

Wittwer, et al., "Experimental Lung Transplantation: Impact of Preservation Solution and Route of Delivery", The Journal of Heart and Lung Transplantation, 24(8):1081-1090, Aug. 2005 (10 pages).

Albes, et al., "Influence of the Perfusate Temperature on Lung Preservation: Is There an Optimum?", European Surgical Research, 29:5-11, 1997 (7 pages).

Besterman, et al., "Regulation of protein synthesis in lung by amino acids and insulin", American Journal of Physiology: Endocrinology and Metabolism, 245(5):E508-E514, Nov. 1, 1983 (7 pages).

Erasmus, et al., "Normothermic ex vivo lung perfusion of non-heart-beating donor lungs in pigs: from pretransplant function analysis towards a 6-h machine preservation", Transplant International, 19(7):589-593, Jul. 1, 2006 (5 pages).

"The secret of the turtle", <https://mag.ebmpapst.com/en/industries/medical/the-secret—of-the-turtle_2433/>, mag: The Magazine of ebm-papst, Sep. 2009 (5 pages).

Baker, et al., "Calcium Content of St. Thomas' II Cardioplegic Solution Damages Ischemic Immature Myocardium", Annals of Thoracic Surgery, 52(4):993-999, Oct. 1991 (7 pages).

Charest, et al., "Design and validation of a clinical-scale bioreactor for long-term isolated lung culture", Author Manuscript published in Final Edited form as Biomaterials, 52:79-87, Jun. 2015 (22 pages).

De Hart, et al., "An ex vivo platform to simulate cardiac physiology: a new dimension for therapy development and assessment", The International Journal of Artificial Organs, 34(6):495-505, Jun. 2011 (11 pages).

Definition of Aqueous from Cambridge Dictionary, https://dictionary.cambridge.org/us/dictionary/english/aqueous, accessed Sep. 14, 2023 (2 pages).

(56) References Cited

OTHER PUBLICATIONS

Definition of Medium, Collins English Dictionary, https://www.collinsdictionary.com/us/dictionary/english/medium#:~:text=You%20use%20medium%20to%20describe,middling%20More%20Synonyms%20of%20medium, accessed Sep. 14, 2023 (2 pages).

Dobson, et al., "Adenosine and lidocaine: A new concept in nondepolarizing surgical myocardial arrest, protection, and preservation", Journal of Thoracic and Cardiovascular Surgery, 127(3):794-805, Mar. 2004 (12 pages).

Ebel, et al., "Lidocaine reduces ischaemic but not reperfusion injury in isolated rat heart", British Journal Anaesthesia, 86(6):846-852, 2001 (7 pages).

Ely, et al., "Protective Effects of Adenosine in Myocardial Ischemia", Circulation, 85(3):893-904, Mar. 1992 (12 pages).

European Extended Search Report issued in European Patent Application No. 17805438.3, dated Jan. 28, 2020 (14 pages).

European Extended Search Report issued in European Patent Application No. 15853016.2, dated Mar. 9, 2018 (12 pages).

European Extended Search Report issued in European Patent Application No. 13738530.8, dated Jan. 25, 2016 (9 pages).

European Extended Search Report issued in European Patent Application No. 15767752.7, dated Nov. 30, 2017 (7 pages).

European Extended Search Report issued in European Patent Application No. 15775970.5, dated Oct. 24, 2017 (10 pages).

European Extended Search Report issued in European Patent Application No. 15867786.4, dated Feb. 8, 2019 (14 pages).

European Extended Search Report issued in European Patent Application No. 18879106.5, dated Dec. 17, 2020 (8 pages).

European Search Report issued in European Patent Application No. 15867786.4, dated Sep. 3, 2018 (11 pages).

Gao, et al., "Role of Troponin I Proteolysis in the Pathogenesis of Stunned Myocardium", Circulation Research, 80(3):393-399, Mar. 1, 1997 (17 pages).

Hearse, et al., "Protection of the myocardium during ischemic arrest", Journal of Thoracic Cardiovascular Surgery, 81(6):873-879, Jun. 1981 (7 pages).

International Preliminary Report on Patentability issued in International Application No. PCT/CA15/50297, dated Oct. 12, 2016 (6 pages).

International Preliminary Report on Patentability, issued in International Application No. PCT/CA15/51084, dated Feb. 15, 2017 (3 pages).

International Preliminary Report on Patentability, issued in International Application No. PCT/CA2015/051316 dated Apr. 10, 2017 (5 pages).

International Preliminary Report on Patentability, issued in International Application No. PCT/CA2013/000031 dated Apr. 23, 2014 (8 pages).

International Preliminary Report on Patentability, issued in International Application No. PCT/CA2015/050201 dated Sep. 27, 2016 (5 pages).

International Search Report and Written Opinion issued by the Canadian Patent Office as International Searching Authority in International Application No. PCT/CA2015/051316, dated Mar. 16, 2016 (8 pages).

International Search Report and Written Opinion issued by Canadian Patent Office as International Searching Authority in International Application No. PCT/CA13/00031, dated Apr. 15, 2013 (9 pages).

International Search Report and Written Opinion issued by Canadian Patent Office as International Searching Authority in International Application No. PCT/CA18/51474, dated Mar. 4, 2019 (6 pages).

International Search Report and Written Opinion issued by the Canadian Patent Office as International Searching Authority in International Application No. PCT/CA15/50201, dated Jun. 10, 2015 (8 pages).

International Search Report and Written Opinion issued by the Canadian Patent Office as International Searching Authority in International Application No. PCT/CA15/50297, dated Jul. 13, 2015 (8 pages).

International Search Report and Written Opinion issued by the Canadian Patent Office as International Searching Authority in International Application No. PCT/CA15/51084, dated Feb. 5, 2016 (8 pages).

Jakobsen, et al., "Adenosine instead of supranormal potassium in cardioplegia: It is safe, efficient, and reduces the incidence of postoperative atrial fibrillation. A randomized clinical trial", Journal of Thoracic and Cardiovascular Surgery, 145(3):812-818, Mar. 2013 (7 pages).

Lim, et al., "Computational analysis of the effect of the type of LVAD flow on coronary perfusion and ventricular afterload", J. Physiol Sci., 59:307-316, 2009 (10 pages).

Mehaffey, et al., "Airway pressure release ventilation during ex vivo lung perfusion attenuates injury", Journal Thoracic Cardiovascular Surgery, 153(1):197-204, Jan. 2017 (8 pages).

Muhlbacher, et al., "Preservation Solutions for Transplantation", Transplantation Proceedings, 31(5):2069-2070, Aug. 1999 (2 pages).

Nelson, et al., "Abstract 736: Determination of Optimum Ventilation Strategy for Ex-Vivo Lung Perfusion: Comparing Negative and Positive Pressure Ventilation", Journal of Heart and Lung Transplantation, 34(4 Supplement):S270, Apr. 2015 (1 page).

O'Blenes, et al., "Protecting the aged heart during cardiac surgery: The potential benefits of del Nido cardioplegia", Journal Thoracic and Cardiovascular Surgery, 141(3):762-770, Mar. 2011 (9 pages).

Popov, et al., "Ex Vivo Lung Perfusion—State of the Art in Lung Donor Pool Expansion", Medical Science Monitor Basic Research, 21:9-14, Feb. 3, 2015 (6 pages).

Raymondos, et al., "Combined Negative- and Positive-Pressure Ventilation for the Treatment of ARDS", Case Reports in Critical Care, Article ID714902, 2015 (5 pages).

Robinson, et al., "Lowering the calcium concentration in St. Thomas' Hospital cardioplegic solution improves protection during hypothermic ischemia", Journal Thoracic and Cardiovascular Surgery, 101(2):314-325, Feb. 1991 (12 pages).

Rudd, et al., "Eight hours of cold static storage with adenosine and lidocaine (Adenocaine) heart preservation solutions: Toward therapeutic suspended animation", Journal of Thoracic Cardiovascular Surgery, 142(6):1552-1561, Dec. 2011 (10 pages).

Rudd, et al., "Toward a new cold and warm nondepolarizing, normokalemic arrest paradigm for orthotopic heart transplantation", The Journal of Thoracic and Cardiovascular Surgery, 137(1):198-207, Jan. 2009 (10 pages).

Sutherland, et al., "The Isolated Blood And Perfusion Fluid Perfused Heart", https://www.southalabama.edu/ishr/help/hearse/, Cardiovascular Research—The Centre for Cardiovascular Biology and Medicine, The Rayne Institute, King's College, St Thomas' Hospital, London, UK; originally retrieved on Oct. 16, 2017, accessed Aug. 28, 2023 (12 pages).

Takemoto, et al., "The reciprocal protective effects of magnesium and calcium in hyperkalemic cardioplegic solutions on ischemic myocardium", Basic Research in Cardiology, 87(6):559-569, 1992 (11 pages).

Tane, et al., "Ex Vivo Lung Perfusion: A Key Tool for Translational Science in the Lungs", Chest, 151(6):1220-1228, Jun. 2017 (9 pages).

Taylor, et al., "Registry of the International Society for Heart and Lung Transplantation: Twenty-sixth Official Adult Heart Transplant Report—2009", Journal of Heart and Lung Transplantation, 28(10):1007-1022, Oct. 2009 (16 pages).

Tipton, et al., "The use of Langendorff preparation to study the bradycardia of training", Medicine and Science in Sports, 9(4):220-230, 1977 (11 pages).

unitslab.com, Online Converter, Lidocaine, https://unitslab.com/node/178, retrieved Aug. 29, 2023 (3 pages).

White et al., "Abstract 735: Impact of Initial Acidic Reperfusion on the Functional Recovery of DCD Hearts During Ex Vivo Heart Perfusion", Journal of Heart and Lung Transplantation, 34(4S):S269-S270, Apr. 2015 (2 pages).

(56) References Cited

OTHER PUBLICATIONS

White, et al., "Abstract 385: Impact of Initial Acidic Reperfusion on the Functional Recovery of DCD Hearts During Ex Vivo Heart Perfusion", Canadian Journal Cardiology, 30:S251-252, 2014 (2 pages).
White, et al., "Impact of Reperfusion Calcium and pH on the Resuscitation of Hearts Donated After Circulatory Death", Annals of Thoracic Surgery, 103:122-130, Jan. 2017 (9 pages).
Wild et al., "PEEP and CPAP", British Journal of Anaesthesia, 1(3):89-92, 2001 (4 pages).
Zhong, et al., "The management experience of long duration roller pump ventricular assist device," Chinese Journal of ECC, 9(3):134-137, Sep. 15, 2011 (4 pages)—English Abstract Only.

* cited by examiner

ORGAN CARE SOLUTION FOR EX-VIVO MACHINE PERFUSION OF DONOR LUNGS

CROSS-REFERENCE TO RELATED APPLICATIONS

This application is a divisional application of U.S. patent application Ser. No. 13/446,706 filed on Apr. 13, 2012, which claims the benefit under 35 U.S.C. § 119(e), of provisional application U.S. Ser. No. 61/475,524, filed on Apr. 14, 2011, entitled, "ORGAN CARE SOLUTION FOR EX-VIVO MACHINE PERFUSION OF DONOR LUNGS", the entire subject matter of which is incorporated herein by reference. This application also incorporates by reference, the entirety of U.S. application Ser. No. 12/099,715, filed on Apr. 8, 2008, entitled, "SYSTEMS AND METHODS FOR EX VIVO LUNG CARE".

TECHNICAL FIELD

The disclosure generally relates a perfusion solution for ex-vivo organ care. More particularly, the disclosure relates to a solution for machine perfusion of donor lungs on an organ care system ("OCS") at physiologic or near-physiologic conditions.

BACKGROUND

Current organ preservation techniques typically involve hypothermic storage of the organ in a chemical perfusion solution. In the case of the lung, it is typically flushed with a cold preservation solution such as Perfadex™ and then immersed in that same cold solution until it is transplanted. These techniques utilize a variety of cold preservation solutions, none of which sufficiently protect the lungs from tissue damage resulting from ischemia. Such injuries are particularly undesirable when an organ, such as a lung, is intended to be transplanted from a donor into a recipient.

Using conventional approaches, tissue injuries increase as a function of the length of time an organ is maintained ex-vivo. For example, in the case of a lung, typically it may be preserved ex-vivo for only about 6 to about 8 hours before it becomes unusable for transplantation. As a result, the number of recipients who can be reached from a given donor site is limited, thereby restricting the recipient pool for a harvested lung. Compounding the effects of cold ischemia, current cold preservation techniques preclude the ability to evaluate and assess an organ ex-vivo. Because of this, less-than-optimal organs may be transplanted, resulting in post-transplant organ dysfunction or other injuries, or resuscitatable organs may be turned down.

Prolonged and reliable ex-vivo organ care would also provide benefits outside the context of organ transplantation. For example, a patient's body, as a whole, can typically tolerate much lower levels of chemo-, bio- and radiation therapy than many particular organs. An ex-vivo organ care system would permit an organ to be removed from the body and treated in isolation, reducing the risk of damage to other parts of the body. Thus, there is a need to develop techniques and perfusion solutions that do not require hypothermic storage of the organ and extend the time during which an organ can be preserved in a healthy state ex-vivo. Such techniques would improve transplant outcomes and enlarge potential donor and recipient pools.

SUMMARY

The disclosure provides improved methods, solutions, and systems related to ex-vivo organ care. In general, in one aspect, the disclosure features a lung OCS solution for machine perfusion of donor lungs on OCS at near physiologic conditions. In another aspect, the disclosure includes a system and method for perfusing one or more lungs ex-vivo for an extended period of time in a functional and viable state maintenance mode at near physiologic conditions. In another aspect the disclosure includes a method of producing a solution for ex-vivo perfusion of a donor lung at near physiologic conditions.

The present disclosure describes an OCS lung perfusion solution that can be used for machine perfusion of donor lungs on OCS. The solution may include energy-rich perfusion nutrients, as well as a supply of therapeutics, vasodilators, endothelial stabilizers, and/or preservatives for reducing edema and providing endothelial support to the lungs. In a preferred embodiment, the solution comprises: dextran 40; sodium chloride; potassium chloride; magnesium sulfate anhydrate; disodium phosphate anhydrate; monopotassium phosphate; glucose monohydrate; milrinone; nitroglycerin; insulin; a multi-vitamin (M.V.I. Adult® or equivalent); sodium bicarbonate; methylprednisolone (SoluMedrol® or equivalent); cefazolin; Ciprofloxacin; voriconazole. The solution is mixed with whole blood or packed red blood cells to form the OCS lung perfusion solution. The solution provides the components for maintaining a functional (e.g., under respiration) and viable lung ex-vivo at near physiologic conditions.

According to certain embodiments, solutions with particular solutes and concentrations are selected and proportioned to provide for the organ to function at physiologic or near physiologic conditions. For example, such conditions include maintaining organ function at or near a physiological temperature and/or preserving an organ in a state that permits normal cellular metabolism, such as protein synthesis and increasing colloid pressure, minimize lung edema and cell swelling.

In another embodiment, a method of perfusing a lung is featured. The method includes: positioning the lung in an ex-vivo perfusion circuit; circulating an OCS lung solution specifically for machine perfusion of donor lungs on OCS through the lung, the fluid entering the lung through a pulmonary artery interface and leaving the lung through a left atrial interface; ventilating the lung by flowing a ventilation gas through a tracheal interface; deoxygenating the perfusion solution until a predetermined first value of oxygen content in the perfusion solution is reached; reoxygenating the perfusion solution by ventilating the lung with an oxygenation gas until a predetermined second value of oxygen content in the perfusion solution is reached; and determining a condition of the lung based on a time taken for the lung to cause the oxygen content level in the perfusion solution to change from the first value of oxygen content to the second value of oxygen content.

In another embodiment, a method of producing a solution for perfusing a lung at near physiologic conditions is featured. This method includes combining pre-weighed raw materials including nutrients, colloids, hormones, steroids, buffers and vasodilators with water for injection ("WFI") and mixed with heating until fully dissolved, monitoring the pH level of the resulting solution, allowing the solution to cool, filtering the cooled solution, dispensing the solution into a primary container and sterilizing the filled container.

In another aspect, a lung care system is featured. The lung system includes: a single use disposable module including an interface adapted to couple the single use disposable module with the multiple use module for electro-mechanical interoperation with the multiple use module; a lung chamber assembly optionally having a first interface for allowing a flow of a lung OCS perfusion solution into the lung, a second interface for allowing ventilation of the lung with a ventilation gas, and a third interface for allowing a flow of the perfusion solution away from the lung, the lung chamber assembly including a dual drain system for carrying the flow of the perfusion solution away from the lung, the dual drain system comprising a measurement drain for directing a part of the perfusion solution flow to a sensor of a perfusion solution gas content and a main drain for receiving a remaining part of perfusion solution flow; and an OCS lung perfusion solution specifically for machine perfusion of donor lungs on OCS.

BRIEF DESCRIPTION OF THE DRAWINGS

The following figures depict illustrative embodiments in which like reference numerals refer to like elements. These depicted embodiments may not be drawn to scale and are to be understood as being illustrative and not as limiting.

DETAILED DESCRIPTION

Figure 1:
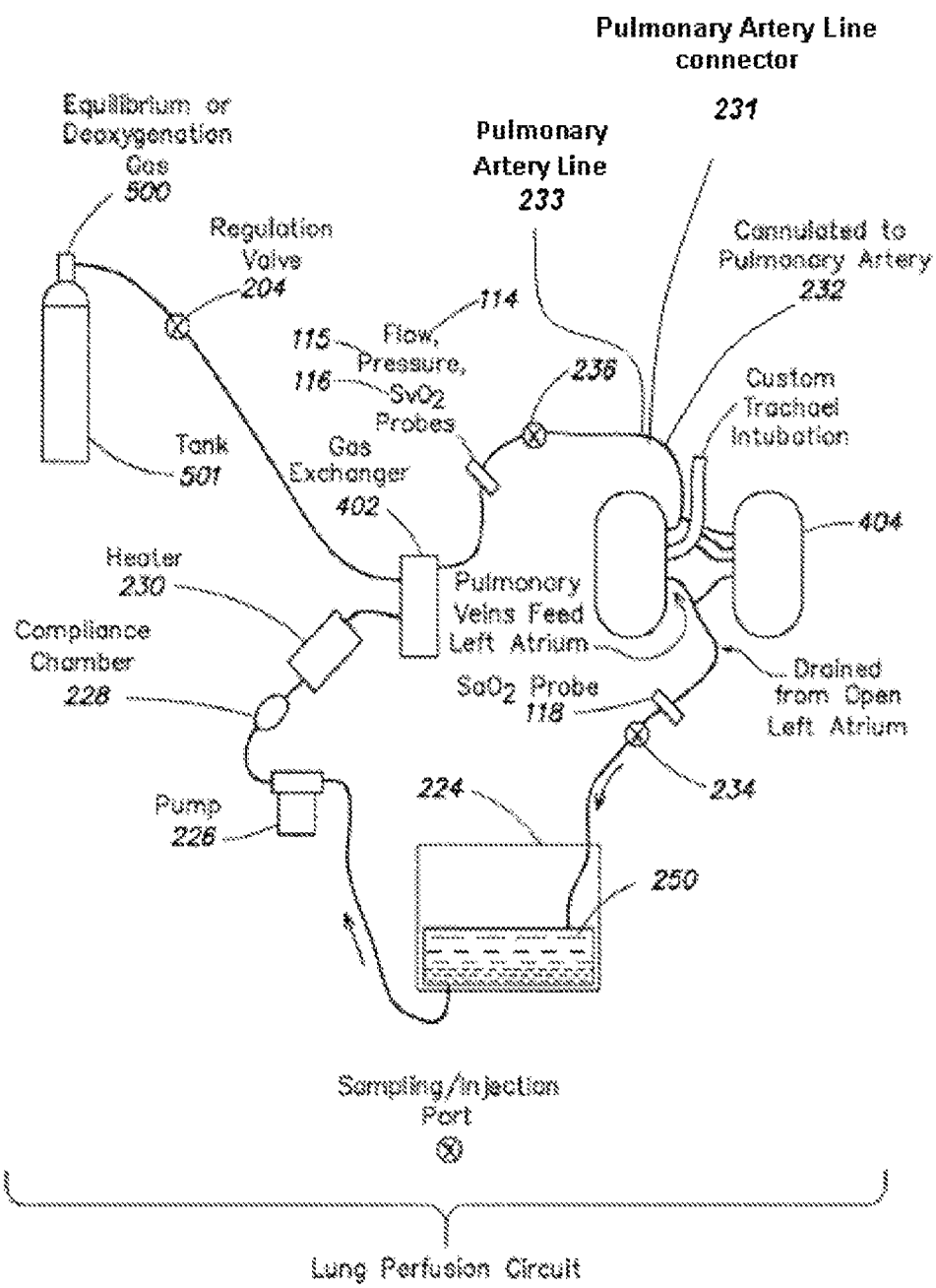
FIG. 1 is a schematic diagram of the lung perfusion circuit of the described embodiment.

The following description and the drawings illustrate embodiments sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments encompasses the full ambit of the claims and all available equivalents of those claims.

Improved approaches to ex-vivo organ care are provided. More particularly, various embodiments are directed to improved methods and solutions relating to maintaining a lung at or near normal physiologic conditions in an ex-vivo environment. As used herein, "physiological temperature" is referred to as temperatures between about 25 degrees C. and about 37 degrees C. A preferred embodiment comprises a lung OCS perfusion solution that may be administered in conjunction with an organ care system to maintain a lung in an equilibrium state by circulating a perfusion solution through the lung's vascular system, while causing the lung to rebreath a gas having an oxygen content sufficient to met the lung's metabolic needs.

The embodiments allow a lung to be maintained ex-vivo for extended periods of time, such as, for example, 3-24 or more hours. Such extended ex-vivo maintenance times expand the pool of potential recipients for donor lungs, making geographic distance between donors and recipients less important. Extended ex-vivo maintenance times also provide the time needed for better genetic and HLA matching between donor organs and organ recipients, increasing the likelihood of a favorable outcome. The ability to maintain the organ in a near physiologic functioning condition also allows a clinician to evaluate the organ's function ex-vivo, and identify organs that are damaged. This is especially valuable in the case of the lung, since lungs are often compromised as a direct or indirect result of the cause of the death of the donor. Thus even a newly harvested lung may be damaged. The ability to make a prompt assessment of a harvested organ allows a surgeon to determine the quality of a lung and, if there is damage, to make a determination of the nature of the problem. The surgeon can then make a decision as to whether to discard the lung, or to apply therapy to the lung. Therapies can include recruitment processes, removing or stapling off damaged areas of lung, suctioning secretions, cauterizing bleeding blood vessels, and giving radiation treatment. The ability to assess and, if necessary provide therapy to lungs at several stages from harvesting to implantation greatly improves the overall likelihood of lung transplant success and increases the number of organs available for transplant. In some instances, the improved assessment capability and extended maintenance time facilitates medical operators to perform physical repairs on donor organs with minor defects. Increased ex-vivo organ maintenance times can also provide for an organ to be removed from a patient, treated in isolation ex-vivo, and then put back into the body of a patient. Such treatment may include, without limitation, pharmaceutical treatments, gas therapies, surgical treatments, chemo-, bio-, gene and/or radiation therapies.

Overview of OCS Perfusion Solution

According to certain embodiments, a lung OCS perfusion solution with certain solutes provides for the lungs to function at physiologic or near physiologic conditions and temperature by supplying energy rich nutrients, oxygen delivery, optimal oncotic pressure, pH and organ metabolism. The perfusion solution may also include therapeutic components to help maintain the lungs and protect them against ischemia, reperfusion injury and other ill effects during perfusion. Therapeutics may also help mitigate edema, provide general endothelial tissue support for the lungs, and otherwise provide preventative or prophylactic treatment to the lungs.

The amounts of solutes provided describes preferred amounts relative to other components in the solution and may be scaled to provide compositions of sufficient quantity.

In one embodiment, the solution may include a phosphodiesterase inhibitor. To improve gas exchange and diminish leukocytosis, an adenosine-3',5'-cyclic monophosphate (cAMP) selective phosphodiesterase type III (PDE III) inhibitor such as milrinone, amrinone, anagrelide, bucladesine, cilostamide, cilostazol, enoximone, KMUP-1, quazinone, RPL-554, siguazodan, trequinsin, vesnarinone, zardaverine may be added. In a preferred embodiment milrinone is added. Milrinone has the effects of vasorelaxation secondary to improved calcium uptake into the sarcoplasmic reticulum, inotropy (myocyte contraction) due to cAMP-mediated trans-sarcolemmal calcium flux, and lusitropy (myocyte relaxation) possibly due to improved actin-myosin complex dissociation. In a preferred embodiment milrinone is present in each 1 L of solution in an amount of about 3400 mcg to about 4600. In a particularly preferred embodiment, milrinone is present in each 1 L of solution in an amount of about 4000 mcg.

In certain embodiments the solution may include a nitrate which is useful in the nitrogen cycle. Nitroglycerin is a nitrate that may be added to the perfusion solution to promote stabilization of pulmonary hemodynamics and improve arterial oxygenation after transplantation. When a lung is removed from the body, nitric oxide levels fall quickly because it is quenched by superoxide generated during reperfusion, resulting in damage to the lung tissue. Nitroglycerin can act to promote nitric oxide levels in a lung ex-vivo by way of intracellular S-nitrosothiol intermediates to directly stimulate guanylate cyclase or to release nitric oxide locally in effector cells. To this end, Nitroglycerin improves vascular homeostasis and improves organ function by providing better arterial oxygenation after transplant. In a preferred embodiment nitroglycerin is present in each 1 L of solution in an amount of about 10 mg to about 50 mg.

In one other embodiment, magnesium sulfate anhydrate may be added to the solution. Pulmonary artery blood pressure is lower than blood pressure in the rest of the body and in the case of pulmonary hypertension, magnesium sulfate promotes vasodilatation in constricted muscles of the pulmonary arteries by modulating calcium uptake, binding and distribution in smooth muscle cells, thereby decreasing the frequency of depolarization of smooth muscle and thus promoting vasodilatation. Magnesium sulfate anhydrate is present in each 1 L of solution in an amount of about 0.083 g to about 0.1127 g. In a particularly preferred embodiment magnesium sulfate anhydrate is present in each 1 L of solution in an amount of about 0.098 g.

In a preferred embodiment, the addition of colloids offers numerous benefits including improving erythrocyte deformability, preventing erythrocyte aggregation, inducing disbanding of already aggregated cells and preserving endothelial-epithelial membrane. Colloids also have anti-thrombotic effects by being able to coat endothelial surfaces and platelets. In this embodiment dextran 40 is present in each 1 L of solution in an amount of about 42.5 g to about 57.5 g. In a particularly preferred embodiment, dextran 40 is present in each 1 L of solution in an amount of about 50 g.

The solution may also contain electrolytes, such as sodium, potassium, chloride, sulfate, magnesium and other inorganic and organic charged species, or combinations thereof. A suitable component may be those where valence and stability permit, in an ionic form, in a protonated or unprotonated form, in salt or free base form, or as ionic or covalent substituents in combination with other components that hydrolyze and make the component available in aqueous solutions. In this embodiment, sodium chloride is present in each 1 L of solution in an amount of about 6.8 g to about 9.2 g. In a particularly preferred embodiment, sodium chloride is present in each 1 L of solution in an amount of about 8 g.

In a preferred embodiment the solution may have a low-potassium concentration. A low-level of potassium results in improved lung function. A low potassium level may also protect the lung during high flow reperfusion and lead to a lower PA pressure and PVR, lower percent decrease in dynamic airway compliance, and lower wet to dry ratio. In this embodiment potassium chloride is present in each 1 L of solution in an amount of about 0.34 g to about 0.46 g. In a particularly preferred embodiment potassium chloride is present in each 1 L of solution in an amount of about 0.4 g.

The solutions may include one or more energy-rich components to assist the organ in conducting its normal physiologic function. These components may include energy rich materials that are metabolizable, and/or components of such materials that an organ can use to synthesize energy sources during perfusion. Exemplary sources of energy-rich molecules include, for example, one or more carbohydrates. Examples of carbohydrates include glucose monohydrate, monosaccharides, disaccharides, oligosaccharides, polysaccharides, or combinations thereof, or precursors or metabolites thereof. While not meant to be limiting, examples of monosaccharides suitable for the solutions include octoses; heptoses; hexoses, such as fructose, allose, altrose, glucose, mannose, gulose, idose, galactose, and talose; pentoses such as ribose, arabinose, xylose, and lyxose; tetroses such as erythrose and threose; and trioses such as glyceraldehyde. In a preferred embodiment glucose monohydrate is present in each 1 L of solution an amount of about 1.7 g to about 2.3 g. In a particularly preferred embodiment glucose monohydrate is present in each 1 L of solution an amount of about 2 g.

The solution may include other components to help maintain the organ and protect it against ischemia, reperfusion injury and other ill effects during perfusion. In certain exemplary embodiments these components may include a hormone to promote and regulate carbohydrate and fat metabolism. Insulin acts to improve cell function by promoting optimum glucose and glycogen intake into the cells. In this preferred embodiment each 1 L of the solution may contain about 17 IU insulin to about 23 IU insulin. In a particularly preferred embodiment each 1 L of the solution may contain 20 IU insulin.

In addition, the solution may include a multi-vitamin that provides anti-oxidants and co-enzymes and helps maintain the body's normal resistance and repair processes. The multi-vitamin may include certain fat soluble vitamins such as Vitamins A, D, E, and K, and water soluble vitamins such as Vitamin C, Niacinamide, Vitamins $B_2$, $B_1$, $B_6$, and Dexpanthenol, as well as stabilizers and preservatives. In a preferred embodiment, each 1 L of the solution contains one unit vial of M.V.I. Adult® multi-vitamin. M.V.I. Adult® includes fat soluble vitamins such as Vitamins A, D, E, and K, and water soluble vitamins such as Vitamin C, Niacinamide, Vitamins $B_2$, $B_1$, $B_6$, and Dexpanthenol, as well as stabilizers and preservatives in an aqueous solution.

The solution may also include an anti-inflammatory agent such as a glucocorticoid steroid. Glucocorticoid steroids act as anti-inflamatory agents by activating to the cell's glucocorticoid receptors which in turn up-regulate the expression of anti-inflammatory proteins in the nucleus and reduce the expression of pro-inflammatory proteins. Glucocorticoid steroids include methylprednisolone, hydrocortisone, cortisone acetate, prednisone, dexamethasone, betamethasone, triamcinolone, beclometasone, fludrocortisone acetate and aldosterone. In this preferred embodiment, each 1 L of the solution may contain about 0.85 g mg to about 1.15 g methylprednisolone (SoluMedrol® or equivalent). In a particularly preferred embodiment, each 1 L of the solution may contain 1 g methylprednisolone (SoluMedrol® or equivalent)

In addition the solution may contain buffers to maintain the solution at an optimal pH. These may include disodium phosphate anhydrate, a physiologic balancing buffer or monopotassium phosphate to maintain the average pH of the solution during lung tissue perfusion. In this embodiment disodium phosphate anhydrate is present in each 1 L of solution in an amount of about 0.039 g to about 0.052 g, and/or monopotassium phosphate in an amount of about 0.053 g to about 0.072 g. In a particularly preferred embodiment, disodium phosphate anhydrate is present in an amount of 0.046 g, and/or monopotassium phosphate in an amount of 0.063 g. In some embodiments, the solution contains sodium bicarbonate, potassium phosphate, or TRIS buffer. In a preferred embodiment the sodium bicarbonate is present in each 1 L of solution in an amount of about 12.75 mEq to about 17.25 mEq. In a particularly preferred embodiment each 1 L of the solution may initially contain about 15 mEq sodium bicarbonate (5 mEq to each 500 mL bottle and 2-3 bottles are used), and additional amounts may be added throughout preservation based on clinical judgment. For example, 20-40 mEq can be added to the system as part of priming.

Other suitable buffers include 2-morpholinoethanesulfonic acid monohydrate (IVIES), cacodylic acid, $H_2CO_3/NaHCO_3$ ($pK_{a1}$), citric acid ($pK_{a3}$), bis(2-hydroxyethyl)-imino-tris-(hydroxymethyl)-methane (Bis-Tris), N-carbamoylmethylimidino acetic acid (ADA), 3-bis[tris (hydroxymethyl)methylamino]propane (Bis-Tris Propane) ($pK_{a1}$), piperazine-1,4-bis(2-ethanesulfonic acid) (PIPES), N-(2-Acetamido)-2-aminoethanesulfonic acid (ACES), imidazole, N,N-bis(2-hydroxyethyl)-2-aminoethanesulfonic acid (BES), 3-(N-morpholino)propanesulphonic acid (MOPS), $NaH_2PO_4/Na_2HPO_4$ ($pK_{a2}$), N-tris(hydroxymethyl)methyl-2-aminoethanesulfonic acid (TES), N-(2-hydroxyethyl)-piperazine-N'-2-ethanesulfonic acid (HEPES), N-(2-hydroxyethyl) piperazine-N'-(2-hydroxypropanesulfonic acid) (HEPPSO), triethanolamine, N-[tris(hydroxymethyl)methyl]glycine (Tricine), tris hydroxymethylaminoethane (Tris), glycineamide, N,N-bis(2-hydroxyethyl) glycine (Bicine), glycylglycine ($pK_{a2}$), N-tris(hydroxymethyl)methyl-3-aminopropanesulfonic acid (TAPS), or a combination thereof.

The solution may contain an antimicrobial or antifungal agent to prevent infection. These may include bacteria and fungal antimicrobial agents that provide protection against both gram negative and gram positive bacteria. Suitable antimicrobial or antifungal agents include cefazolin, ciprofloxacin, and voriconazole or equivalent. In a preferred embodiment, cefazolin is present in each 1 L of solution in an amount of about 0.85 g to about 1.15 g, ciprofloxacin is present in each 1 L of solution in an amount of about 0.17 g to about 2.3 g, and voriconazole is present in each 1 L of solution in an amount of about 0.17 g to about 2.3 g. In a particularly preferred embodiment, cefazolin is present in each 1 L of solution in an amount of about 1 g, ciprofloxacin is present in each 1 L of solution in an amount of about 0.2 g, and voriconazole is present in each 1 L of solution in an amount of about 0.2 g. Alternatively the solution may contain any effective antimicrobial or antifungal agent.

The solutions are preferably provided at a physiological temperature and maintained thereabout throughout perfusion and recirculation.

In a preferred embodiment the OCS lung perfusion solution comprises a nutrient, a colloid, a vasodilator, a hormone and a steroid.

In another preferred embodiment the solution comprises a nutrient including Glucose monohydrate, sodium chloride, potassium chloride, a multi-vitamin including fat-soluble and water-soluble vitamins; a colloid including dextran 40; a hormone including insulin; a steroid including methylprednisolone; buffering agents including disodium phosphate anhydrate, monopotassium phosphate and sodium bicarbonate; vasodilators including milrinone, nitroglycerin and magnesium sulfate anhydrate; antimicrobial or antifungal agents including cefazolin, ciprofloxacin, and voriconazole.

In another preferred embodiment the solution comprises an effective amount of dextran 40; sodium chloride; potassium chloride; magnesium sulfate anhydrate; disodium phosphate anhydrate; monopotassium phosphate; glucose monohydrate; milrinone; nitroglycerin; insulin; a multi-vitamin (M.V.I. Adult® or equivalent); sodium bicarbonate; methylprednisolone (SoluMedrol® or equivalent); cefazolin; ciprofloxacin; voriconazole.

In a preferred embodiment of the OCS lung perfusion solution, each 1 L of solution includes, milrinone in an amount of about 4000 mcg; nitroglycerin in an amount of about 10-50 mg; dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; insulin in an amount of about 20 IU; a multi-vitamin (M.V.I. Adult® or equivalent) in the amount of about 1 unit vial; sodium bicarbonate is initially present in an amount of about 15 mEq; methylprednisolone in an amount of about 1 g.

In a particularly preferred embodiment of the OCS lung perfusion solution, each 1 L of solution includes, milrinone in an amount of about 4000 mcg; nitroglycerin in an amount of about 10-50 mg; dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; insulin in an amount of about 20 IU; a multi-vitamin (M.V.I. Adult® or equivalent) in the amount of about 1 unit vial; sodium bicarbonate is initially present in an amount of about 15 mEq; methylprednisolone in an amount of about 1 g; cefazolin in an amount of about 1 g; ciprofloxacin in an amount of about 0.2 g; voriconazole in an amount of about 0.2 g.

In certain embodiments, the perfusion solution is maintained and provided to the lungs at a near physiologic temperature. According to one embodiment, the perfusion solution employs a blood product-based perfusion solution to more accurately mimic normal physiologic conditions. The perfusion solution may be supplemented with cellular media. The cellular media may include a blood product, such as whole blood, or packed red blood cells; allogenic packed red blood cells that are leukocyte depleted/reduced; donor's whole blood that is leukocyte and platelet depleted/reduced; and/or human plasma to achieve circulating hematocrit of 15-30%.

Overview of Method of Producing a Solution for Perfusing a Lung at Near Physiologic Temperature In another aspect, a method of producing a solution for perfusing a lung at near physiologic temperature is provided. In a preferred method, the pre-weighed raw materials and WFI are added to a stainless steel mixing tank and mixed with heating until fully dissolved. The pH of the resulting solution is monitored and adjusted during the mixing process with 1M hydrochloric acid (HCl). The solution is allowed to cool and then filtered through a 0.2 μm filter and finally dispensed into a primary container. The filled container is terminally sterilized with heat using a sterilization cycle that has been validated to achieve a Sterility Assurance Level of $10^{-6}$. The raw materials in a preferred embodiment include a nutrient, a colloid, a vasodilator, a hormone and a steroid for perfusing a lung at near physiologic conditions.

In another preferred embodiment the raw materials include a nutrient including glucose monohydrate, sodium chloride, potassium chloride, a multi-vitamin including M.V.I. Adult® or equivalent; a colloid including dextran 40;

a hormone including insulin; a steroid including methylprednisolone; buffering agents including disodium phosphate anhydrate, monopotassium phosphate and sodium bicarbonate; vasodilators including milrinone, nitroglycerin and magnesium sulfate anhydrate; an antimicrobial or antifungal agent.

In another preferred embodiment the raw materials include dextran 40; sodium chloride; potassium chloride; magnesium sulfate anhydrate; disodium phosphate anhydrate; monopotassium phosphate; glucose monohydrate; milrinone; nitroglycerin; insulin; a multi-vitamin (M.V.I. Adult® or equivalent); sodium bicarbonate; methylprednisolone (SoluMedrol® or equivalent); antimicrobial or antifungal agents including cefazolin, ciprofloxacin, and voriconazole for perfusing a lung at near physiologic conditions.

In a preferred embodiment, for each 1 L of solution, the raw materials include milrinone in an amount of about 4000 mcg; nitroglycerin in an amount of about 10-50 mg; dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; insulin in an amount of about 20 IU; a multi-vitamin (M.V.I. Adult® or equivalent) in the amount of about 1 unit vial; sodium bicarbonate is initially present in an amount of about 15 mEq; methylprednisolone in an amount of about 1 g; an antimicrobial or antifungal agent.

In another particularly preferred embodiment, for each 1 L of solution, the raw materials include milrinone in an amount of about 4000 mcg; nitroglycerin in an amount of about 10-50 mg; dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; insulin in an amount of about 20 IU; a multi-vitamin (M.V.I. Adult® or equivalent) in the amount of about 1 unit vial; sodium bicarbonate is initially present in an amount of about 15 mEq; methylprednisolone in an amount of about 1 g; cefazolin in an amount of about 1 g; ciprofloxacin in an amount of about 0.2 g; voriconazole in an amount of about 0.2 g.

Overview of Method of Flushing an Organ with a Solution Between Excise from the Donor and Instrumentation on OCS In another aspect, there is provided a method of flushing an organ with a solution between excise from the body and instrumentation on OCS. In this embodiment, to prepare a donor lung for surgical removal from the donor's chest and to remove all old donor blood from the lung, the donor lung is flushed ante-grade using the pulmonary artery with the solution until the temperature of the donor lung is in the range of about 0 degrees C. to about 30 degrees C. Additionally, the solution may be used for retrograde flush of the lung using the pulmonary veins to remove any blood clots remaining in the donor lung prior to surgical removal of the lung from the donor's chest, and to ensure adequate homogenous distribution of flush solution to all lung segments. The lungs are ventilated using a ventilator during both ante-grade and retro-grade flushing to allow for homogenous distribution of the solution and to increase the oxygen concentration in the donor lung alveoli to minimize the impact of ischemia/reperfusion injury on the donor lung. Once the ante-grade and retrograde flushing of the donor lung is completed, the lung will be removed surgically while inflated to minimize collapsing of the alveoli. Once the donor lung is fully removed from the donor body, it is ready to the next phase of OCS perfusion.

In one embodiment, the solution comprises an energy-rich perfusion nutrient, a colloid, a hormone, a buffer, magnesium sulfate anhydrate, and a nitrate. In another embodiment, the solution comprises dextran 40; sodium chloride; potassium chloride; magnesium sulfate anhydrate; disodium phosphate anhydrate; monopotassium phosphate; glucose monohydrate; nitroglycerin.

In a particularly preferred embodiment each 1 L of solution for ante-grade flush comprises dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; nitroglycerin in an amount of about 50 mg.

In another particularly preferred embodiment each 1 L of solution for retrograde flush comprises dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; nitroglycerin in an amount of about 10 mg.

Overview of Method of Machine Perfusion Using Lung OCS Perfusion Solution

In another aspect, a method for machine perfusion of a donor lung is provided. The method includes perfusing the donor lung with a OCS lung perfusion solution comprising: dextran 40; sodium chloride; potassium chloride; magnesium sulfate anhydrate; disodium phosphate anhydrate; monopotassium phosphate; glucose monohydrate; milrinone; nitroglycerin; insulin; at least two vitamins; sodium bicarbonate; methylprednisolone (SoluMedrol® or equivalent); a microbial or antifungal agent.

In a further aspect, the method includes perfusing the donor lung with a particularly preferred OCS lung perfusion solution comprising for each 1 L of solution: milrinone in an amount of about 4000 mcg; nitroglycerin in an amount of about 10-50 mg; dextran 40 in an amount of about 50 g; sodium chloride in an amount of about 8 g; potassium chloride in an amount of about 0.4 g; magnesium sulfate anhydrate in an amount of about 0.098 g; disodium phosphate anhydrate in an amount of about 0.046 g; monopotassium phosphate in an amount of about 0.063 g; glucose monohydrate in an amount of about 2 g; insulin in an amount of about 20 IU; a multi-vitamin (M.V.I. Adult® or equivalent) in the amount of about 1 unit vial; sodium bicarbonate is initially present in an amount of about 15 mEq; methylprednisolone in an amount of about 1 g; cefazolin in an amount of about 1 g; ciprofloxacin in an amount of about 0.2 g; voriconazole in an amount of about 0.2 g.

Overview of the Lung Perfusion Circuit

FIG. 1 illustrates an exemplary lung perfusion circuit which can be used to circulate the perfusion solution noted above. The circuit is housed entirely within a lung perfusion module, and all its components may be disposable. The organ care system (OCS) disclosure, U.S. application Ser. No. 12/099,715, includes an exemplary embodiment of a lung perfusion circuit and is incorporated in its entirety by reference. Lung OCS perfusion solution 250 is placed in a reservoir and then circulates within the perfusion circuit, passing through various components of lung perfusion module before passing through the vascular system of lungs 404. Pump 226 causes perfusion solution 250 to flow around the lung perfusion circuit. It receives perfusion solution 250 from reservoir 224, and pumps the solution through compliance chamber 228 to heater 230. Compliance chamber 228 is a flexible portion of tubing that serves to refine the flow characteristics nature of pump 226. Heater 230 replaces heat lost by perfusion solution 250 to the environment during circulation of the fluid. In the described embodiment, the heater maintains perfusion solution 250 at or near the physiologic temperature of 30-37 degrees C., and preferably at about 34 degrees C. After passing through heater 230, perfusion solution 250 flows into gas exchanger 402. Gas exchanger 402 allows gases to be exchanged between gas and perfusion solution 250 via a gas-permeable, hollow fiber membrane. However, the gas exchanger has an effective gas exchange surface area of about 1 square meter, which is only a fraction of the 50-100 square meter effective exchange area of the lungs. Thus gas exchanger 402 has only a limited gas exchange capability compared to the lungs. Blood gas solenoid valve 204 regulates the supply of gas into gas exchanger 402. The composition of gas supplied to gas exchanger is determined by which mode the OCS is in. For example, when OCS 100 is in a sequential assessment mode, deoxygenation gas 500 from deoxygenation gas tank 501 is supplied to the gas exchanger. Sampling/injection port 236 facilitates the removal of a sample or the injection of a chemical just before perfusion solution 250 reaches the lungs. Perfusion solution then enters lungs 404 through cannulated pulmonary artery 232. Flow probe 114 measures the rate of flow of perfusion fluid 250 through the system. In the described embodiment, flow probe 114 is placed on the perfusate line as it leads towards the pulmonary artery. Pressure sensor 115 measures pulmonary arterial pressure at the point of entry of perfusion fluid 250 into the lungs. Oxygen probe 116 measures oxygen in perfusion fluid 250 just before it enters the lungs. In the described embodiment, perfusion solution 250 is the lung OCS solution described previously.

Figure 2:
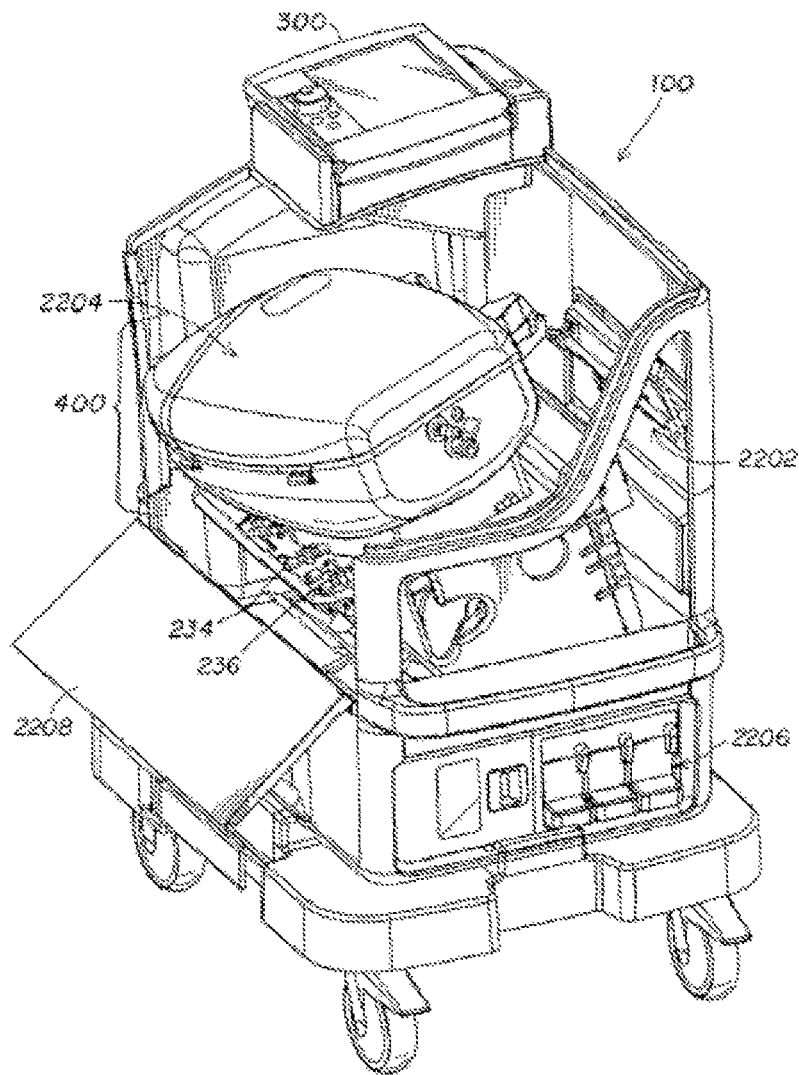
FIG. 2 is an illustration of the organ care system drawn from a 45-degree angle from the front view, according to the described embodiment.

FIG. 2 is an overall view of OCS console 100 showing the single use, disposable lung perfusion module in a semi-installed position. As broadly indicated in FIG. 2, single use disposable lung perfusion module is sized and shaped to fit into OCS console 100, and to couple with it. Overall, the unit has a similar form to the organ care system described in U.S. patent application Ser. No. 11/788,865. Removable lung perfusion module 400, is insertable into OCS console 100 by means of a pivoting mechanism that allows module 400 to slide into the organ console module from the front, as shown in FIG. 2, and then pivot towards the rear of the unit. Clasp mechanism 2202 secures lung perfusion module 400 in place. In alternative embodiments, other structures and interfaces of lung perfusion module 400 are used to couple the module with OCS 100. When secured in place, electrical and optical connections (not shown) provide power and communication between OCS console 100 and lung perfusion module 400. Details of the electrical and optical connections are described in U.S. patent application Ser. No. 11/246,013, filed on Oct. 7, 2005, the specification of which is incorporated by reference herein in its entirety. A key component of lung perfusion module 400 is organ chamber 2204, which is described in detail below. Battery compartments 2206 and maintenance gas cylinder 220 (not shown) are located in the base of the OCS console 100. OCS console 100 is protected by removable panels, such as front panels 2208. Just below lung perfusion module are perfusion solution sampling ports 234 and 236. Mounted on top of OCS console 100 is OCS monitor 300.

Figure 3:
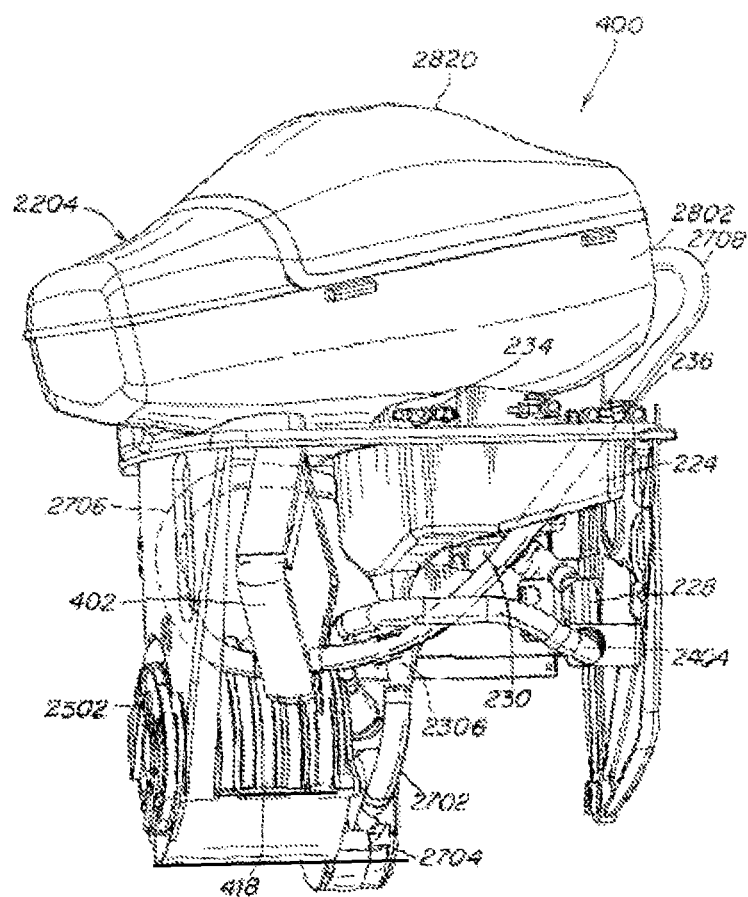
FIG. 3 is an illustration of the lung perfusion module, according to the described embodiment.

FIG. 3 is a front view of lung perfusion module 400. Organ chamber 2204 includes a removable lid 2820 and housing 2802. Sampling ports, including LA sampling port 234 and PA sampling port 236 are visible below organ chamber 2802. Gas exchanger 402, bellows 418, and bellows plate 2502 are also visible in the figure.

The circulation path of the perfusion solution, which was first described in connection with FIG. 2, in terms of the components of lung perfusion module 400 is now addressed. Mounted below organ chamber 2204 are perfusion solution reservoir 224, which stores perfusion solution 250. The perfusion solution exits through one-way inflow valve 2306, line 2702, and pump dome 2704 to pump 226 (not shown). The perfusion solution is pumped through perfusion solution line 2404 through compliance chamber 228, and then to perfusion solution heater 230. After passing through heater 230, the perfusion solution passes through connecting line 2706 to gas exchanger 402.

Figure 4:
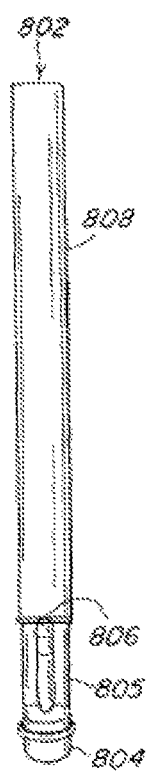
FIG. 4 is an illustration of the pulmonary artery cannula, according to the described embodiment.
Figure 5:
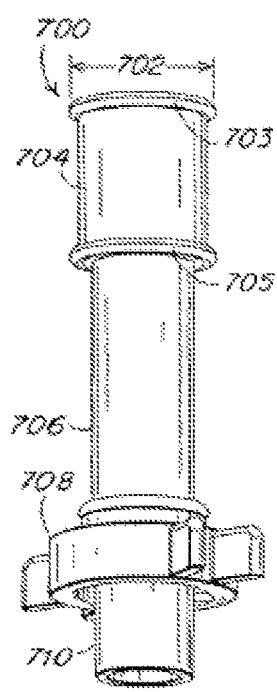
FIG. 5 is an illustration of the tracheal cannula, according to the described embodiment.

The pulmonary artery (PA) cannula connects the perfusion circuit with the vascular system of lungs 404. An exemplary embodiment of a pulmonary artery (PA) cannula is shown in FIG. 4. Referring to FIG. 4, single PA cannula 802 has single insertion tube 804 for insertion into a single PA, and is used to cannulate the PA at a point before it branches to the two lungs. To connect the cannula to the pulmonary artery, insertion tube 804 is inserted into the PA, and the PA is secured onto the tube with sutures. The tracheal cannula 700 is inserted into the trachea to provide a means of connection between the lung perfusion module 400 gas circuit and the lungs. FIG. 5 illustrate an exemplary tracheal cannulae. Cannula 700 includes tracheal insertion portion 704 having an insertion portion tip diameter 702, to which the trachea is secured with a cable tie, or by other means. At the end of insertion portion 704 that is inserted into the trachea is rib 703; the rib helps secure insertion portion 704 at the inserted location within the trachea, and is secured with a cable tie placed around the trachea. At the opposite end of insertion portion 704, second rib 705, having a diameter about 0.2 inches greater than the base part diameter of insertion portion 704, acts as a stop for the silicone over-layer and as a stop for the trachea. The tracheal cannula may be clamped at flexible portion 706 prior to instrumentation to seal off air flow in and out of the lungs 404. Also illustrated is an optional locking nut 708.

The perfusion solution exits gas exchanger 402 through connecting line 2708 to the interface with the pulmonary artery. After flowing through the lung and exiting via the pulmonary vein and the left atrium, the perfusion solution drains through from the base of organ chamber 2204, as described below. These drains feed the perfusion solution to reservoir 224, where the cycle begins again.

Figure 6:
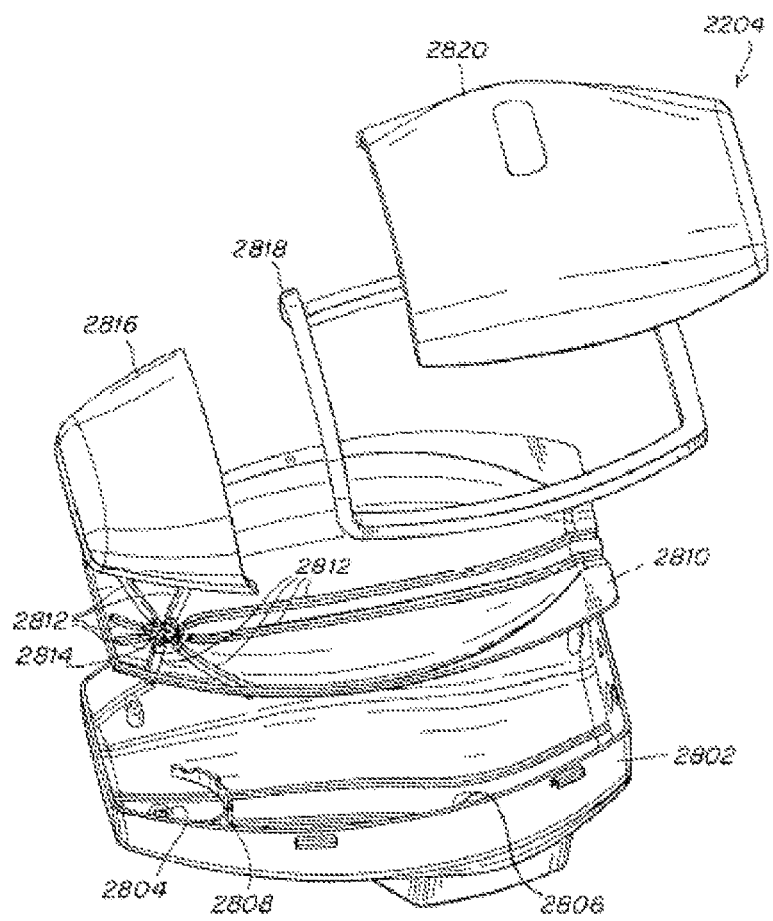
FIG. 6 is an exploded illustration of the lung chamber, according to the described embodiment.

Having described OCS console 100 and lung perfusion module 400, we now describe organ chamber 2204. FIG. 6 shows an exploded view of the components of organ chamber 2204. The top of organ chamber 2204 is covered with a sealable lid that includes front piece 2816, top piece 2820, inner lid with sterile drape (not shown), and sealing piece 2818 that seals front piece 2816 to top piece 2820. Base 2802 of chamber 2204 is shaped and positioned within lung perfusion module 400 to facilitate the drainage of the perfusion solution. Organ chamber 2204 has two drains, measurement drain 2804, and main drain 2806, which receives overflow from the measurement drain. Measurement drain 2804 drains perfusion solution at a rate of about 0.5 l/min, considerably less than perfusion solution 250 flow rate through lungs 404 of between 1.5 l/min and 4 l/min. Measurement drain leads to oxygen probe 118, which measures SaO$_2$ values, and then leads on to reservoir 224. Main drain 2806 leads directly to reservoir 224 without oxygen measurement. Oxygen probe 118, which is a pulse oximeter in the described embodiment, cannot obtain an accurate measurement of perfusion solution oxygen levels unless perfusion solution 250 is substantially free of air bubbles. In order to achieve a bubble-free column of perfusion solution, base 2802 is shaped to collect perfusion solution 250 draining from lungs 404 into a pool that collects above drain 2804. The perfusion solution pool allows air bubbles to dissipate before the perfusion solution enters drain 2804. The formation of a pool above drain 2804 is promoted by wall 2808, which partially blocks the flow of perfusion solution from measurement drain 2804 to main drain 2806 until the perfusion solution pool is large enough to ensure the dissipation of bubbles from the flow. Main drain 2806 is lower than measurement drain 2804, so once perfusion solution overflows the depression surrounding drain 2804, it flows around wall 2808, to drain from main drain 2806. In an alternate embodiment of the dual drain system, other systems are used to collect perfusion solution into a pool that feeds the measurement drain. In some embodiments, the flow from the lungs is directed to a vessel, such as a small cup, which feeds the measurement drain. The cup fills with perfusion solution, and excess blood overflows the cup and is directed to the main drain and thus to the reservoir pool. In this embodiment, the cup performs a function similar to that of wall 2808 in the embodiment described above by forming a small pool of perfusion solution from which bubbles can dissipate before the perfusion solution flows into the measurement drain on its way to the oxygen sensor.

Lungs 404 are supported by support surface 2810. The surface is designed to support lungs 404 without applying undue pressure, while angling lungs 404 slightly downwards towards the lower lobes to promote easy drainage of the perfusion solution. Support surface includes drainage channels 2812 to collect and channel perfusion solution issuing from lungs 404, and to guide the perfusion solution towards drain 2814, which feeds perfusion solution directly to the blood pool for measurement drain 2804. To provide additional support for the lungs, lungs 404 are wrapped with a polyurethane wrap (not shown) when placed on support surface 2810. The polyurethane wrap anchors lungs 404, helps keep the lungs in a physiologic configuration, and prevents the bronchi from being kinked and limiting the total volume of inflation. The wrap provides a smooth surface for the exterior of the lung to interface with organ chamber 2204, reducing the risk of the chamber applying excessive pressure on any part of lungs 404, which might cause undesirable hemorrhaging.

Figure 7:
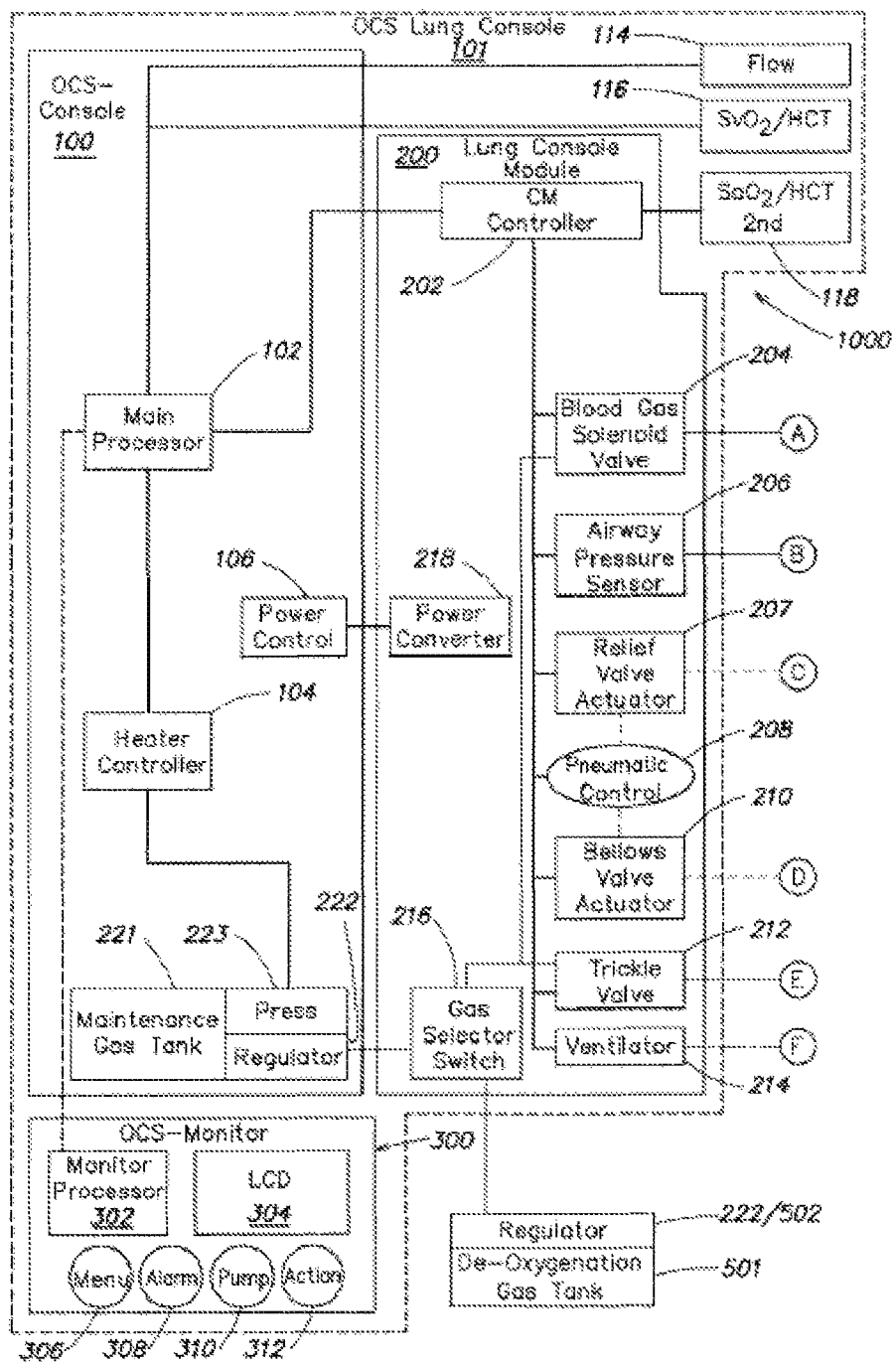
FIG. 7 is a schematic diagram of the described embodiment of a portable organ care system including shows the gas-related components of the lung perfusion module.

FIG. 7 is a schematic diagram of the described embodiment of a portable organ care system including the gas-related components of the lung perfusion module. The organ care system 1000 includes a permanent, multiple use, non-disposable section, OCS lung console 101, and a single use disposable section, lung perfusion module 400. Regulator 222/502 converts the gas tank pressure to 25 mm Hg for use in the system. Internal maintenance gas tank 221 contains a mixture that is designed to provide enough oxygen to maintain the lung tissue during maintenance mode. Pressure transducer 223 measures the pressure of internal maintenance gas in tank 221, so that the amount of gas remaining can be determined. Controller 202 manages the release of maintenance and assessment gases by controlling the valves, gas selector switch 216, and ventilator 214, thus implementing the preservation of the lungs in maintenance mode, or the assessment of the lungs in one of the assessment modes. Blood gas solenoid valve 204 controls the amount of gas flowing into blood gas exchanger 402. Airway pressure sensor 206 samples pressure in the airway of lungs 404, as sensed through isolation membrane 408. Relief valve actuator 207 is pneumatically controlled, and controls relief valve 412. The pneumatic control is carried out by inflating or deflating orifice restrictors that block or unblock the air pathway being controlled. This method of control allows complete isolation between the control systems in lung console module 200 and the ventilation gas loop in lung perfusion module 400. Pneumatic control 208 controls relief valve 207 and bellows valve actuator 210. Trickle valve 212 controls delivery of gas to the airway of lungs 404. Ventilator 214 is a mechanical device with an actuator arm that causes bellows 418 to contract and expand, which causes inhalation and exhalation of gas into and out of lungs 404. OCS monitor 300 provides user control of OCS 1000 via buttons, and displays data from the system's sensors that indicate the state of the lungs and of the various subsystems within OCS 1000. Monitor 300 is universal, i.e., it can be used for any organ. It includes monitor processor 302 that runs the software controlling monitor 300 and displays data on LCD 304. OCS monitor 300 includes four control buttons for the user: menu button 306 brings up the configuration menu; alarm button 308 silences the speaker; pump button 310 controls the circulatory pump; and action button 312 provides access to certain organ-specific actions, such as ventilator control, or to system actions, such as saving a session file to an external memory card. Other controls can also be included, such as a knob for controlling a value or selecting an item.

Use Models

An exemplary model for using the solution described above in the organ care system is described below.

The process of preparing the OCS perfusion module 400 for instrumentation begins by producing the solution by the method of producing a solution for perfusing a lung at near physiologic temperature as described previously. About 800 ml to about 2000 ml of the OCS lung perfusion solution is then added into the Organ Care System (OCS) sterile perfusion module 400. The solution is then supplemented with about 500 ml to about 1000 ml of cellular media. The cellular media may include one or combination of the following to achieve total circulating hematocrit concentration between 15-30%: typed allogenic packed red blood cells (pRBCs) that is leukocytes depleted/reduce; donor's whole blood that is leukocyte and platelet depleted/reduced; and/or human plasma to achieve circulating hematocrit of 15-30%. The OCS device operates to circulate and mix the solution and cellular media while warming and oxygenating the solution using a built in fluid warmer and gas exchanger 402. Once the solution is fully mixed, warmed and oxygenated, the pH of the solution will be adjusted using sodium bicarbonate or other available buffer solution as needed. Once the solution's hematocrit, temperature and pH levels reach an acceptable state, the donor lung will be instrumented on OCS.

Once the solution is fully mixed, pH is adjusted to 7.35-7.45 and hematocrit is adjusted to 15-30%, the donor lung will be instrumented on OCS. To begin instrumentation, first set the flow rate of the OCS Pump 226 to about 0.05 L/min. to ensure that perfusion solution does not exit the PA line 233 prior to connecting the trachea cannula 700. Place the lung in the OCS' organ chamber 224 and connect the trachea cannula 700 to the OCS trachea connector 710 and unclamp trachea cannula at section 706. Then connect a PA pressure monitoring line with pressure sensor 115, to the PA cannula 802, including pressure transducer connector 806. To connect the cannula to the pulmonary artery, insertion tube 804 is inserted into the PA, and the PA is secured onto the tube with sutures. Insertion tube 804 of cannula 802 connects to connector portion 805, which serves to position insertion tube 804 at an angle and location suitable for strain-free connection to the pulmonary artery of lungs 404. Connection portion 805 connects to main tube portion 808, which is attached to the perfusion fluid circuit. Trim the OCS' PA cannula 802 and prepare to connect to the OCS PA line connector 231. Next, increase the OCS' pump 226 flow to about 0.3 to about 0.4 L/min. so that a low-flow column of solution exits the PA line 233. Then remove any air from the lung by connecting the lung PA cannula 802 to the OCS PA line connector 231 and gradually filling the PA cannula 802 with perfusion solution. Once an air-free column of solution is reached inside the PA cannula 802, seal the connection between the PA cannula 802 and the OCS PA line connector 231.

Next, gradually raise the OCS fluid warmer 230 temperature to 37 degrees C., and bring the perfusion solution temperature from about 32 degrees C. to about 37 degrees C. Then begin increasing the pump flow gradually, ensuring that pulmonary arterial pressure ("PAP") remains below 20 mmHg, until pulmonary flow rate reaches a target flow rate of at least 1.5 L/min. When the lung reaches a temperature of about 30 degrees C. to about 32 degrees C., begin OCS ventilation by turning the OCS ventilator 214 to "preservation" mode. The ventilator settings for instrumentation and preservation are specified in Table 1.

TABLE 1

Ventilator Settings (Instrumentation and Preservation)

| Parameter | Requirement |
| --- | --- |
| Tidal Volume (TV) | = or <6 ml/kg |
| Respiratory Rate (RR) | 10 breaths/min |
| Positive End Expiratory Pressure (PEEP) | 7-8 cm $H_2O$ Note: decrease to 5 cm$H_2O$ after confirming adequate inflation of lungs (within 2 hours) |
| I:E Ratio | 1:2-1:3 |
| Peak Airway Pressure (PAWP) | <25 cmH2O |

Next, gradually increase the perfusion and ventilation rate for up to about 30 minutes until reaching full ventilation and perfusion and allow ventilation parameters to stabilize. Once ventilation parameters of the donor lung on OCS have stabilized, wrap the lung to avoid over inflation injury to the donor lung ex-vivo. The lung may also be wrapped during "pause preservation" before beginning ventilation. During preservation of lung on OCS, ventilation settings are maintained as described in Table 1, the mean PAP is maintained under about 20 mmHg, and the pump flow is maintained at not less than about 1.5 L/min. Blood glucose, electrolytes and pH levels are monitored and adjusted within normal physiologic ranges by additional injections. Lung oxygenation function may be assessed using the OCS lung system in addition to lung compliance. In some instances it is desirable to provide therapy to the lung as described previously. Fiberoptic bronchoscopy may be performed for the donor lung ex-vivo on the OCS device. Once preservation and assessment of the donor lung on the OCS system is complete, the lung is cooled and removed from the OCS system to be transplanted into the recipient.

Donor lung cooling may be achieved by first shutting off the OCS pulsatile pump 226 and flush the donor lung with about 3 liters of perfusion solution at a temperature of about 0 degrees C. to about 15 degrees C. while continuing ventilation on the OCS system. Once the flush is complete the trachea 700 and pulmonary artery 802 cannulae may be disconnected from the OCS and the lung will be immersed in cold preservation solution until it is surgically attached to the recipient (transplanted). Alternatively, the entire system circulating OCS solution may be cooled down to 0 degrees C. to about 15 degrees C. using a heat-exchanger and cooling device while the lung is being ventilated on OCS. Once the target temperature of about 0 degrees C. to about 15 is achieved, the trachea 700 and pulmonary artery 802 cannulae will be disconnected from the OCS and the lung will be immersed in cold preservation solution until it is surgically attached to the recipient (transplanted).

The described system may utilize any embodiment of the lung OCS perfusion solution. In a preferred embodiment, the solution is mixed with red blood cells and placed into a system reservoir for use in the system.

It is to be understood that while the invention has been described in conjunction with the various illustrative embodiments, the forgoing description is intended to illustrate and not limit the scope of the invention, which is defined by the scope of the appended claims. For example, a variety of systems and/or methods may be implemented based on the disclosure and still fall within the scope of the invention. Other aspects, advantages, and modifications are within the scope of the following claims. All references cited herein are incorporated by reference in their entirety and made part of this application.

What is claimed is:

1. A method of perfusing a donor lung at or near physiologic conditions comprising:
    flushing the donor lung prior to excising the donor lung from a donor's body with at least one flushing solution including at least one nutrient, at least one colloid, at least one buffer, and magnesium sulfate anhydrate;
    excising the donor lung from the donor's body;
    placing the donor lung on an organ care system (OCS); and
    flowing a perfusion liquid through the donor lung, the perfusion liquid being at a physiologic temperature, the perfusion liquid comprising:
        a nutrient, a colloid, a hormone, a steroid, a buffer, magnesium sulfate anhydrate, an antimicrobial agent and at least one of a phosphodiesterase inhibitor or a nitrate.

2. The method of claim 1, wherein in the perfusion liquid the nutrient includes glucose monohydrate, sodium chloride, potassium chloride, and a multi-vitamin; the colloid includes dextran 40; the hormone includes insulin; the steroid includes methylprednisolone; the buffer includes disodium phosphate anhydrate, monopotassium phosphate and sodium bicarbonate; phosphodiesterase inhibitor includes milrinone, and the nitrate includes nitroglycerin.

3. The method of claim 2, wherein each liter of the perfusion liquid comprises
    milrinone in an amount of about 4000 mcg;
    nitroglycerin in an amount of about 10 mg to 50 mg;
    dextran 40 in the amount of about 50 g;
    sodium chloride in an amount of about 8 g;
    potassium chloride in an amount of about 0.4 g;

magnesium sulfate anhydrate in an amount of about 0.098 g;
disodium phosphate anhydrate in an amount of about 0.046 g;
monopotassium phosphate in an amount of about 0.063 g;
glucose monohydrate in an amount of about 2 g;
insulin in an amount of about 20 IU;
the multi-vitamin in an amount of about 1 unit vial;
sodium bicarbonate in an amount of about 15 mEq; and
methylprednisolone in an amount of about 1 g.

4. The method of claim 1 further comprising mixing the perfusion liquid with whole blood.

5. The method of claim 1 further comprising mixing the perfusion liquid with red blood cells.

6. The method of claim 1 further comprising mixing the perfusion liquid with leukocyte-depleted whole blood.

7. The method of claim 1, further comprising ventilating the donor lung when flushing the donor lung prior to excising the donor lung to allow for homogenous distribution of the at least one flushing solution and to increase the oxygen concentration in the donor lung alveoli.

8. A method of preserving a donor lung comprising:
flushing the donor lung prior to excising the donor lung from a donor's body with at least one flushing solution including at least one nutrient, at least one colloid, at least one buffer, and magnesium sulfate anhydrate;
excising the donor lung from the donor's body;
placing the donor lung on an organ care system (OCS);
perfusing the donor lung in a lung perfusion circuit of the OCS with a perfusion solution including at least one nutrient, at least one colloid, at least one buffer, and magnesium sulfate anhydrate to maintain the donor lung ex-vivo at a near physiological temperature and in a near physiologic functioning condition and to permit normal cellular metabolism in the donor lung, wherein the perfusion solution is supplemented with a circulating hematocrit of between 15% to 30%.

9. The method of claim 8, wherein in the flushing solution:
the at least one nutrient comprises glucose monohydrate, sodium chloride, and potassium chloride;
the at least one colloid comprises dextran 40; and
the at least one buffer comprises disodium phosphate anhydrate and monopotassium phosphate.

10. The method of claim 9, wherein in the flushing solution:
the concentration of the glucose monohydrate is about 2 g/L;
the concentration of the sodium chloride is about 8 g/L;
the concentration of the potassium chloride is about 0.4 g/L;
the concentration of the dextran 40 is about 50 g/L;
the concentration of the disodium phosphate anhydrate is about 0.046 g/L;
the concentration of the monopotassium phosphate is about 0.063 g/L; and
the concentration of the magnesium sulfate anhydrate is about 0.098 g/L.

11. The method of claim 8, wherein the perfusion solution further comprises insulin, a multi-vitamin, sodium bicarbonate, methylprednisolone, milrinone, and nitroglycerin.

12. The method of claim 11, wherein:
the insulin is at a concentration of about 20 IU/L;
the multi-vitamin is at a concentration of about 1 unit vial per liter;
the sodium bicarbonate is at a concentration of about 15 mEq/L;
the methylprednisolone is at a concentration of about 1 g/L;
the milrinone is at a concentration of about 4000 mcg/L; and
the nitroglycerin is at a concentration of 10 mg/L to 50 mg/L.

13. The method of claim 8, wherein the perfusion solution further comprises cefazolin, ciprofloxacin, and voriconazole.

14. The method of claim 13, wherein:
the cefazolin is at a concentration of about 1 g/L;
the ciprofloxacin is at a concentration of about 0.2 g/L; and
the voriconazole is at a concentration of about 0.2 g/L.

15. The method of claim 8, further comprising ventilating the donor lung when flushing the donor lung prior to excising the donor lung to allow for homogenous distribution of the at least one flushing solution and to increase the oxygen concentration in the donor lung alveoli.

16. A method of preserving a donor lung comprising:
flushing the donor lung antegrade prior to excising the donor lung from a donor's body with a first flushing solution;
flushing the donor lung retrograde prior to excising the donor lung from a donor's body with a second flushing solution;
excising the donor lung from the donor's body;
placing the donor lung on an organ care system (OCS);
perfusing the donor lung in a lung perfusion circuit of the OCS with a perfusion solution including at least one nutrient, at least one colloid, at least one buffer, and magnesium anhydrate to maintain the donor lung ex-vivo at a near physiological temperature and in a near physiologic functioning condition and to permit normal cellular metabolism in the donor lung, wherein the perfusion solution is supplemented with a circulating hematocrit of between 15% to 30%;
wherein the first flushing solution and the second flushing solution each include at least one nutrient, at least one colloid, at least one buffer, and magnesium sulfate anhydrate; and
wherein the first flushing solution comprises nitroglycerin at a concentration higher than a concentration of nitroglycerin in the second flushing solution.

17. The method of claim 16, wherein the concentration of nitroglycerin in the first flushing solution is about 50 g/L.

18. The method of claim 16, wherein the concentration of nitroglycerin in the second flushing solution is about 10 g/L.

* * * * *